United States Patent [19]
Sekita et al.

[11] Patent Number: 6,124,986
[45] Date of Patent: Sep. 26, 2000

[54] ZOOM OPTICAL SYSTEM AND IMAGE PICKUP APPARATUS

[75] Inventors: Makoto Sekita; Tsunefumi Tanaka; Keisuke Araki, all of Yokohama; Kenichi Kimura, Kawasaki; Norihiro Nanba, Kawasaki; Hiroshi Saruwatari, Kawasaki; Takeshi Akiyama, Yokohama, all of Japan

[73] Assignee: Canon Kabushiki Kaisha, Tokyo, Japan

[21] Appl. No.: 08/917,911

[22] Filed: Aug. 27, 1997

[30] Foreign Application Priority Data

Aug. 27, 1996 [JP] Japan .................................. 8-244140

[51] Int. Cl.[7] .................................. G02B 15/14; G02B 17/00
[52] U.S. Cl. ................................ 359/691; 359/691; 359/726; 359/727
[58] Field of Search .................................. 359/726–736, 359/691, 69

[56] References Cited

U.S. PATENT DOCUMENTS

| | | | |
|---|---|---|---|
| 3,674,334 | 7/1972 | Offner | 350/55 |
| 4,265,510 | 5/1981 | Cook | 350/55 |
| 4,737,021 | 4/1988 | Korsch | 350/505 |
| 4,743,103 | 5/1988 | Estelle | 350/445 |
| 4,775,217 | 10/1988 | Ellis | 350/538 |
| 4,812,030 | 3/1989 | Pinson | 350/620 |
| 4,971,428 | 11/1990 | Moskovich | 350/442 |
| 4,993,818 | 2/1991 | Cook | 350/505 |
| 5,063,586 | 11/1991 | Jewell et al. | 378/34 |
| 5,559,629 | 9/1996 | Sheets | 359/364 |
| 5,777,804 | 7/1998 | Nakamura | 59/727 |

FOREIGN PATENT DOCUMENTS

| | | |
|---|---|---|
| 2-297516 | 12/1990 | Japan . |
| 5-12704 | 1/1993 | Japan . |
| 6-139612 | 5/1994 | Japan . |

*Primary Examiner*—Georgia Epps
*Assistant Examiner*—Michael A Lucas
*Attorney, Agent, or Firm*—Fitzpatrick, Cella, Harper & Scinto

[57] ABSTRACT

A zoom optical system and an image pickup apparatus using the same are disclosed. The zoom optical system comprises a first optical unit having a refractive power, the first optical unit having a reflecting surface, a second optical unit having a refractive power, and a driving portion for moving a light receiving surface which receives light from an object through the first optical unit and the second optical unit. The zoom optical system performs variation of magnification by moving at least one of the first optical unit and the second optical unit, and a deviation of a focus position due to the variation of magnification is corrected by the light receiving surface being moved by the driving portion.

38 Claims, 14 Drawing Sheets

F I G. 13(A)
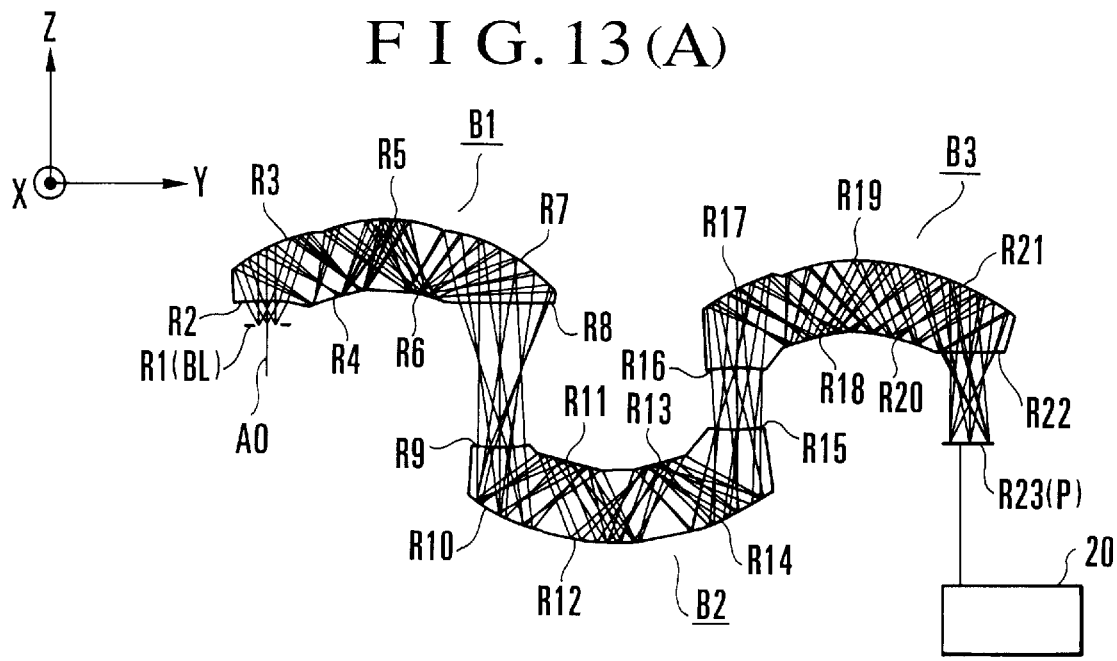
F I G. 13(B)
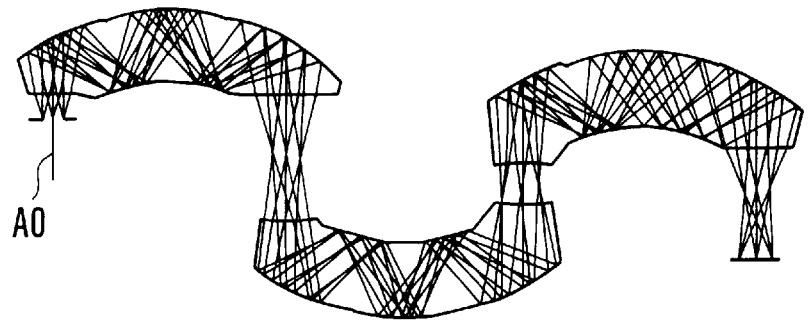
F I G. 13(C)
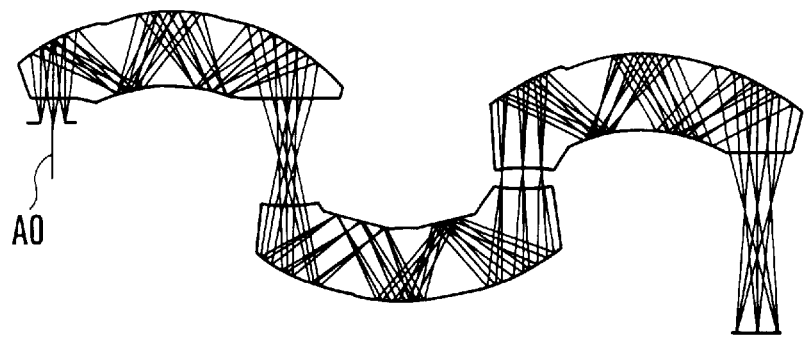

ZOOM OPTICAL SYSTEM AND IMAGE PICKUP APPARATUS

BACKGROUND OF THE INVENTION

1. Field of the Invention

The present invention relates to a zoom optical system and an image pickup apparatus using the same and, more particularly, to an optical arrangement which is suitable for use in a video camera, a still video camera, a copying machine or the like.

2. Description of Related Art

Various photographing optical systems which utilize reflecting surfaces such as concave mirrors and convex mirrors have heretofore been proposed. FIG. 1 is a schematic view of a so-called mirror optical system which is composed of one concave mirror and one convex mirror.

In the mirror optical system shown in FIG. 1, a light beam 104 from an object is reflected by a concave mirror 101 and travels toward an object side while being converged, and after having been reflected by a convex mirror 102, the light beam 104 forms an image of the object on an image plane 103.

This mirror optical system is based on the construction of a so-called Cassegrainian reflecting telescope, and is intended to reduce the entire length of the optical system by folding, by using two opposed reflecting mirrors, the optical path of a telephoto lens system which is composed of refracting lenses and has an entire large length.

For similar reasons, in the field of an objective lens system which constitutes part of a telescope lens system as well, a multiplicity of types which are arranged to reduce the entire length of an optical system by using a plurality of reflecting mirrors have been proposed.

It has heretofore been known that there are methods for obtaining a compact mirror optical system by using reflecting mirrors in place of a lens optical system having an entire large length to efficiently fold an optical path in the above-described manner.

However, in general, the mirror optical system, such as the Cassegrainian reflecting telescope, has the problem that part of an object ray is blocked by the convex mirror 102.

To solve the problem, it has been proposed to provide a mirror optical system which uses decentered reflecting mirrors to prevent a member of the optical system from blocking the area through which the object light beam 104 passes, i.e., to separate a central ray 106 of the object light beam 104 from an optical axis 105.

FIG. 2 is a schematic view of the mirror optical system disclosed in U.S. Pat. No. 3,674,334. This mirror optical system solves the above-described blocking problem by separating a central ray 116 of an object light beam 115 from an optical axis 114 by decentering the central axis of reflecting mirrors from the optical axis 114.

In the mirror optical system shown in FIG. 2, a concave mirror 111, a convex mirror 113 and a concave mirror 112 are arranged in the order of passage of the light beam, and these mirrors 111, 113 and 112 are reflecting mirrors which are rotationally symmetrical about the optical axis 114, as shown by two-dot chain lines in FIG. 2. In the shown mirror optical system, a central ray 116 of an object light beam 115 is separated from the optical axis 114 to prevent blockage of the object light beam 115, by using only the upper portion of the concave mirror 111 which is above the optical axis 114 as viewed in FIG. 2, only the lower portion of the convex mirror 113 which is below the optical axis 114 as viewed in FIG. 2, and only the lower portion of the concave mirror 112 which is below the optical axis 114 as viewed in FIG. 2.

FIG. 3 is a schematic view of the mirror optical system disclosed in U.S. Pat. No. 5,063,586. The mirror optical system shown in FIG. 3 solves the above-described problem by decentering the central axis of each reflecting mirror from an optical axis and separating the principal ray of an object light beam from the optical axis.

As shown in FIG. 3 in which an axis perpendicular to an object plane 121 is defined as an optical axis 127, a convex mirror 122, a concave mirror 123, a convex mirror 124 and a concave mirror 125 are arranged in the order of passage of the light beam, and the central coordinates and central axes 122a, 123a, 124a and 125a (axes which respectively connect the centers of reflecting surfaces and the centers of curvature thereof) of the reflecting surfaces of the respective mirrors 122 to 125 are decentered from the optical axis 127. In the mirror optical system shown in FIG. 3, by appropriately setting the amount of decentering and the radius of curvature of each of the surfaces, each of the reflecting mirrors is prevented from blocking an object light beam 128, so that an object image is efficiently formed on an image forming plane 126.

In addition, U.S. Pat. Nos. 4,737,021 and 4,265,510 also disclose an arrangement for preventing the blocking problem by using part of a reflecting mirror which is rotationally symmetrical about an optical axis, or an arrangement for preventing the blocking problem by decentering the central axis of the reflecting mirror from the optical axis.

In addition, a zooming art is known which varies the image forming magnification (focal length) of a photographing optical system by relatively moving a plurality of reflecting mirrors which constitute part of the aforesaid type of mirror optical system.

For example, U.S. Pat. No. 4,812,030 discloses an art for performing variation of the magnification of the photographing optical system by relatively varying the distance between the concave mirror 101 and the convex mirror 102 and the distance between the convex mirror 102 and the image plane 103 in the construction of the Cassegrainian reflecting telescope shown in FIG. 1.

FIG. 4 is a schematic view of another embodiment disclosed in U.S. Pat. No. 4,812,030. In the embodiment shown in FIG. 4, an object light beam 138 from an object is made incident on and reflected by a first concave mirror 131, and travels toward an object side as a converging light beam and is made incident on a first convex mirror 132. The light beam is reflected toward an image forming plane by the first convex mirror 132 and is made incident on a second convex mirror 134 as an approximately parallel light beam. The light beam is reflected by the second convex mirror 134 and is made incident on a second concave mirror 135 as a diverging light beam. The light beam is reflected by the second concave mirror 135 as a converging light beam and forms an image of the object on an image plane 137.

In this arrangement, a distance 133 between the first concave mirror 131 and the first convex mirror 132 and a distance 136 between the second convex mirror 134 and the second concave mirror 135 are varied to perform zooming, thereby varying the focal length of the entire system.

In the arrangement disclosed in U.S. Pat. No. 4,993,818, an image formed by the Cassegrainian reflecting telescope shown in FIG. 1 is secondarily formed by another mirror optical system provided in a rear stage, and the magnification of the entire photographing optical system is varied by varying the image forming magnification of that secondary image forming mirror optical system.

In any of the above-described reflecting types of photographing optical systems, a large number of constituent components are needed and individual optical components need to be assembled with high accuracy to obtain the required optical performance. Particularly in the type in which decentered reflecting mirrors constitute a mirror optical system as in the conventional example shown in FIG. 3, the reflecting mirrors must be individually disposed with different amounts of decentering, so that an extremely high assembling accuracy is needed.

One proposed approach to solving this problem is to eliminate the incorporation error of optical components which occurs during assembly, as by forming a mirror system as one block.

A conventional example in which a multiplicity of reflecting surfaces are formed as one block is an optical prism, such as a pentagonal roof prism and a Porro prism, which is used in, for example, a viewfinder optical system.

In the case of such a prism, since a plurality of reflecting surfaces are integrally formed, the relative positional relationships between the respective reflecting surfaces are set with high accuracy, so that adjustment of the relative positions between the respective reflecting surfaces is not needed. Incidentally, the primary function of the prism is to reverse an image by varying the direction in which a ray travels, and each of the reflecting surfaces consists of a plane surface.

Another type of optical system, such as a prism having reflecting surfaces with curvatures, is also known.

FIG. 5 is a schematic view of the essential portion of the observing optical system which is disclosed in U.S. Pat. No. 4,775,217. This observing optical system is an optical system which not only allows an observer to observe a scene of the outside but also allows the observer to observe a display image displayed on an information display part, in the form of an image which overlaps the scene.

In this observing optical system, a display light beam 145 which exits from the display image displayed on an information display part 141 enters from an entrance surface 148, and is reflected by a surface 142 and travels toward an object side and is made incident on a half-mirror surface 143 consisting of a concave surface. After having been reflected by the half-mirror surface 143, the display light beam 145 is formed into an approximately parallel light beam by the refractive power of the half-mirror surface 143. This approximately parallel light beam is refracted by and passes through a surface 142, and forms a magnified virtual image of the display image and enters a pupil 144 of an observer so that the observer recognizes the display image.

In the meantime, a light beam 146 from the outside is made incident on a surface 147 which is approximately parallel to the reflecting surface 142, and is then refracted by the surface 147 and reaches the half-mirror surface 143 which is a concave surface. Since the half-mirror surface 143 is coated with an evaporated semi-transparent film, part of the light beam 146 passes through the half-mirror surface 143, is refracted by and passes through the surface 142, and enters the pupil 144 of the observer. Thus, the observer can visually recognize the display image as an image which overlaps the scene of the outside.

FIG. 6 is a schematic view of the essential portion of the observing optical system disclosed in Japanese Laid-Open Patent Application No. Hei 2-297516. This observing optical system is also an optical system which not only allows an observer to observe a scene of the outside but also allows the observer to observe a display image displayed on an information display part, as an image which overlaps the scene.

In this observing optical system, a display light beam 154 which exits from a display image displayed on an information display part 150 enters a prism Pa through a plane surface 157 which constitutes part of the prism Pa, and is made incident on a parabolic reflecting surface 151.

The display light beam 154 is reflected by the reflecting surface 151 as a converging light beam, and forms an image on a focal plane 156. At this time, the display light beam 154 reflected by the reflecting surface 151 reaches the focal plane 156 while being totally reflected between two parallel plane surfaces 157 and 158 which constitute part of the prism Pa. Thus, the thinning of the entire optical system is achieved.

Then, the display light beam 154 which exits from the focal plane 156 as a diverging light beam is totally reflected between the plane surface 157 and the plane surface 158, and is made incident on a half-mirror surface 152 which consists of a parabolic surface. The display light beam 154 is reflected by the half-mirror surface 152 and, at the same time, not only is a magnified virtual image of a display image formed but also the display light beam 154 is formed into an approximately parallel light beam by the refractive power of the half-mirror surface 152. The obtained light beam passes through the surface 157 and enters a pupil 153 of the observer, so that the observer can recognize the display image.

In the meantime, an object light beam 155 from the outside passes through a surface 158b which constitutes part of a prism Pb, then through the half-mirror surface 152 which consists of a parabolic surface, then through the surface 157, and is then made incident on the pupil 153 of the observer. Thus, the observer visually recognizes the display image as an image which overlaps the scene of the outside.

As another example which uses an optical unit on a reflecting surface of a prism, optical heads for optical pickups are disclosed in, for example, Japanese Laid-Open Patent Application Nos. Hei 5-12704 and Hei 6-139612. In these optical heads, after the light outputted from a semiconductor laser has been reflected by a Fresnel surface or a hologram surface, the reflected light is focused on a surface of a disk and the light reflected from the disk is conducted to a detector.

In any of the above-described mirror optical systems having the decentered mirrors, which are disclosed in U.S. Pat. Nos. 3,674,334, 5,063,586 and 4,265,510, since the individual reflecting mirrors are disposed with different amounts of decentering, the mounting structure of each of the reflecting mirrors is very complicated and the mounting accuracy of the reflecting mirrors is very difficult to ensure.

In either of the above-described photographing optical systems having the magnification varying functions, which are disclosed in U.S. Pat. Nos. 4,812,030 and 4,993,818, since a large number of constituent components, such as a reflecting mirror or an image forming lens, are needed, it is necessary to assemble each optical part with high accuracy to realize the required optical performance.

In particular, since the relative position accuracy of the reflecting mirrors is strict, it is necessary to adjust the position and the angle of each of the reflecting mirrors.

As is known, conventional reflecting types of photographing optical systems have constructions which are suited to a so-called telephoto lens using an optical system having an entire large length and a small angle of view. However, if a photographing optical system which needs angles of view from an angle of view of a standard lens to an angle of view of a wide-angle lens is to be obtained, the number of reflecting surfaces which are required for aberration correction must be increased, so that a far higher component accuracy and assembly accuracy are needed and the cost and the entire size of the optical system tend to increase.

Either of the observing optical systems disclosed in U.S. Pat. No. 4,775,217 and Japanese Laid-Open Pat. Application No. Hei 2-297516 is primarily intended to vary the direction of travel of a ray and a pupil's image forming action for efficiently transmitting to the pupil of an observer a display image displayed on the information display part which is disposed away from the pupil of the observer. However, neither of them directly discloses an art for performing positive aberration correction by using a reflecting surface having a curvature.

The range of applications of either of the optical systems for optical pickups which are disclosed in, for example, Japanese Laid-Open Pat. Application Nos. Hei 5-12704 and Hei 6-139612 is limited to the field of a detecting optical system, and neither of them satisfies the image forming performance required for, particularly, an image pickup apparatus which uses an area type of image pickup element, such as a CCD.

BRIEF SUMMARY OF THE INVENTION

An object of the present invention is to provide a zoom optical system using a reflecting surface, which has a novel arrangement capable of solving the disadvantages of the conventional optical systems.

To achieve the above object, in accordance with one aspect of the present invention, there is provided a zoom optical system which comprises a first optical unit having a refractive power, the first optical unit having a reflecting surface, a second optical unit having a refractive power, and driving means for moving a light receiving surface which receives light from an object through the first optical unit and the second optical unit, wherein the zoom optical system performs variation of magnification by moving at least one of the first optical unit and the second optical unit, and a deviation of a focus position due to the variation of magnification is corrected by the light receiving surface being moved by the driving means.

In accordance with another aspect of the present invention, there is provided an image pickup apparatus which comprises a first optical unit having a refractive power, the first optical unit having a reflecting surface, a second optical unit having a refractive power, a light receiving element for receiving light from an object through the first optical unit and the second optical unit, and driving means for moving the light receiving element, wherein the image pickup apparatus performs variation of magnification by moving at least one of the first optical unit and the second optical unit, and a deviation of a focus position due to the variation of magnification is corrected by the light receiving element being moved by the driving means.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIGS. 13(A), 13(B) and 13(C) are cross-sectional views taken on a Y, Z plane, of a zoom optical system according to a second embodiment of the present invention;

DETAILED DESCRIPTION OF THE INVENTION

Preferred embodiments of the present invention will be described below in detail with reference to the accompanying drawings.

Prior to the detailed description of individual embodiments, reference will be made to terms which are herein used to express various constituent elements of the embodiments, and matters common to all the embodiments.

Figure 1:
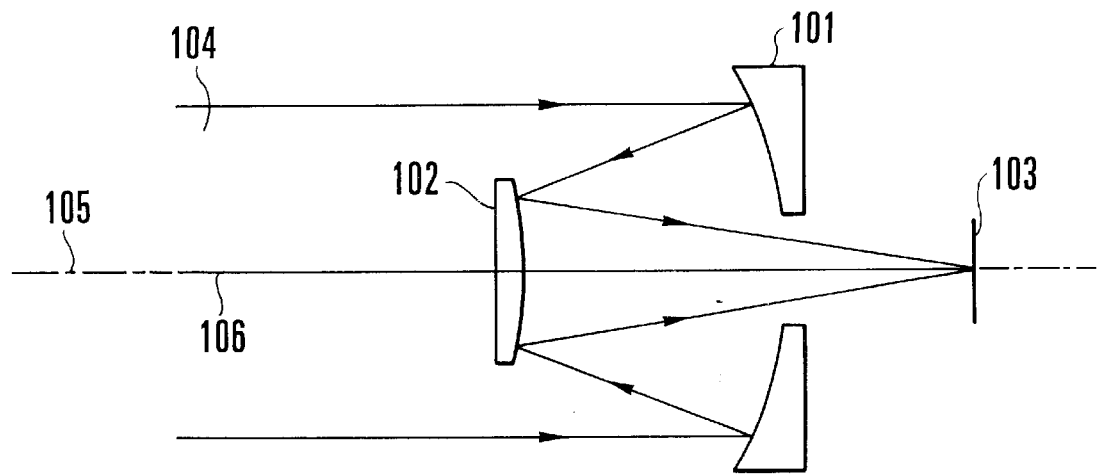
FIG. 1 is a view of the basic construction of a conventional Cassegrainian reflecting telescope.
Figure 2:
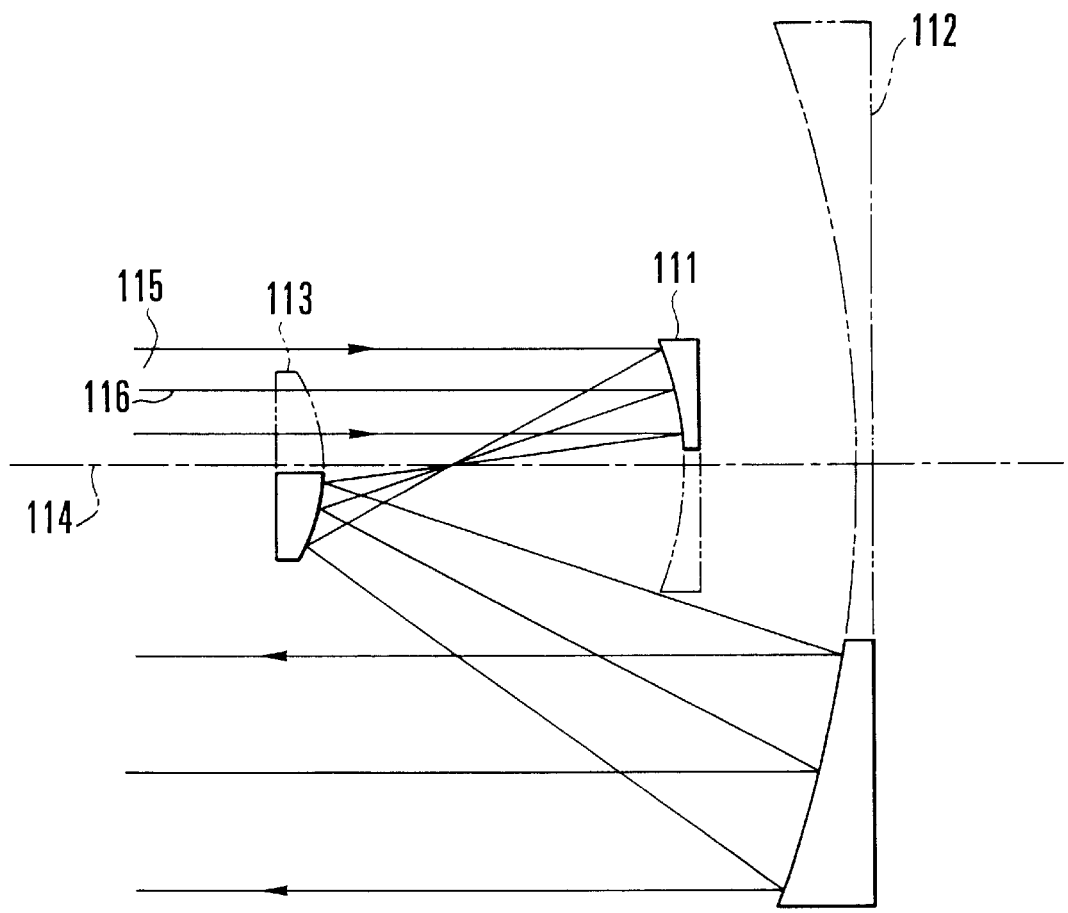
FIG. 2 is an explanatory view aiding in explaining a conventional example for preventing a blocking problem by separating a central ray from an optical axis in a mirror optical system.
Figure 3:
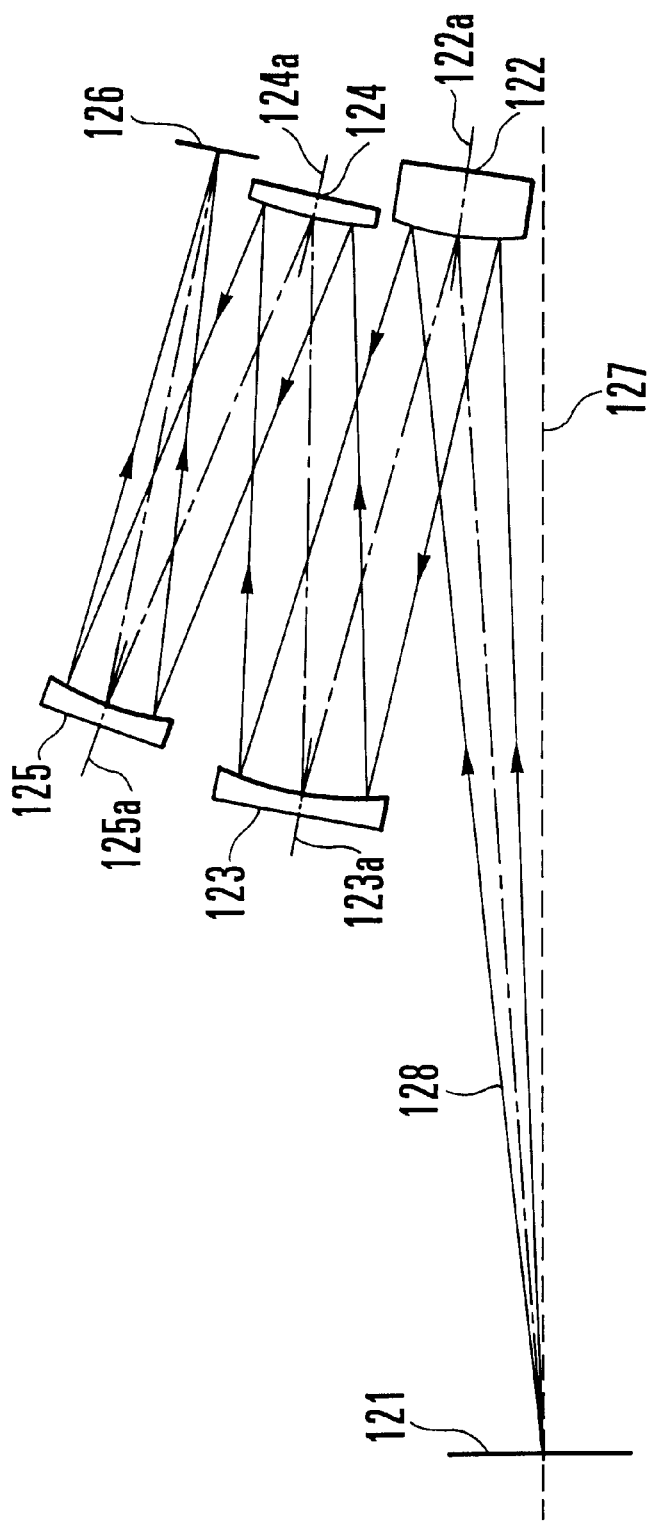
FIG. 3 is an explanatory view aiding in explaining another conventional example for preventing a blocking problem by separating a central ray from an optical axis in a mirror optical system.
Figure 4:
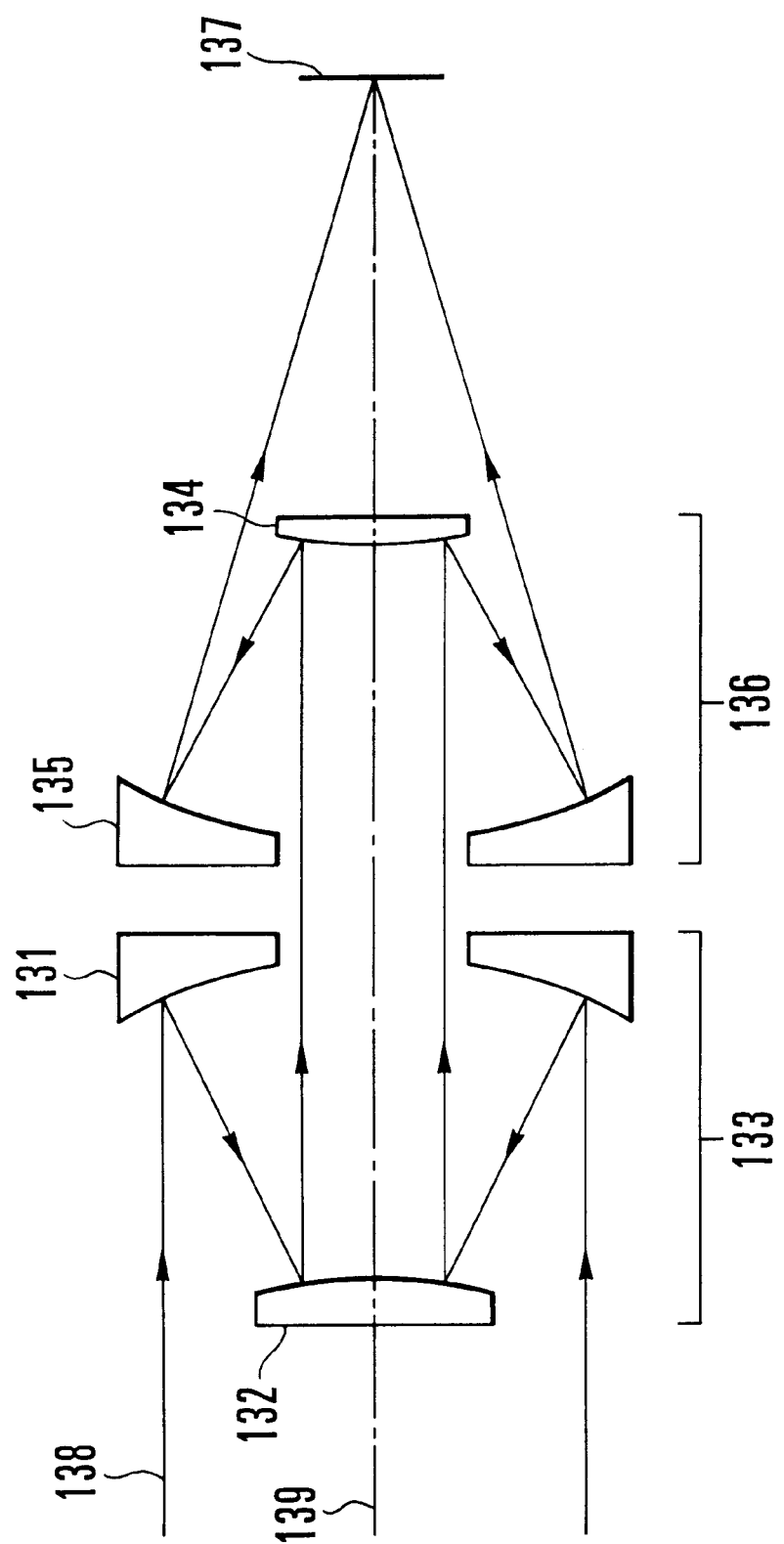
FIG. 4 is a schematic view of a zoom optical system which employs a conventional reflecting mirror arrangement.
Figure 5:
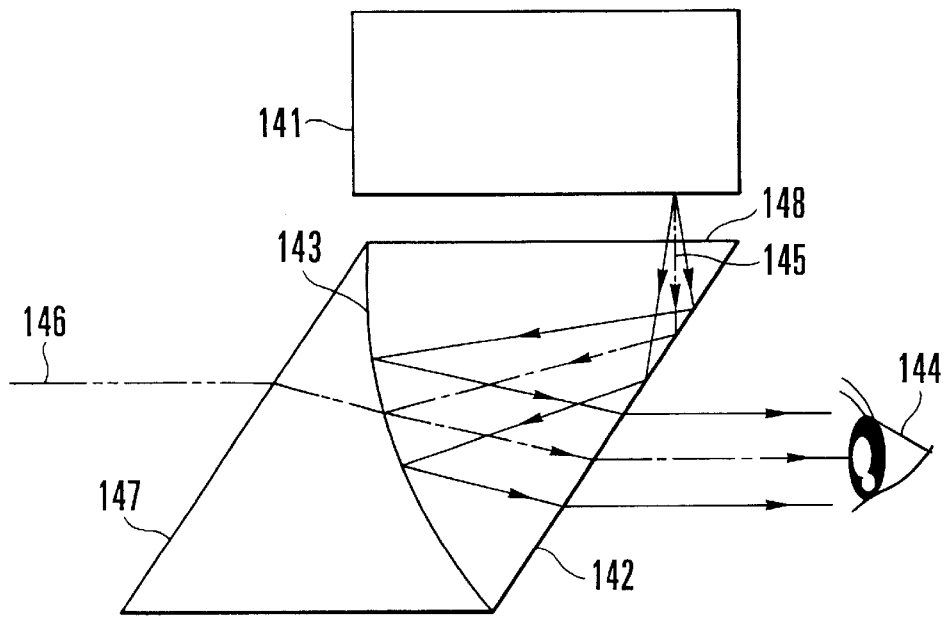
FIG. 5 is a schematic view of an observing optical system in which a conventional prism reflecting surface has a curvature.
Figure 6:
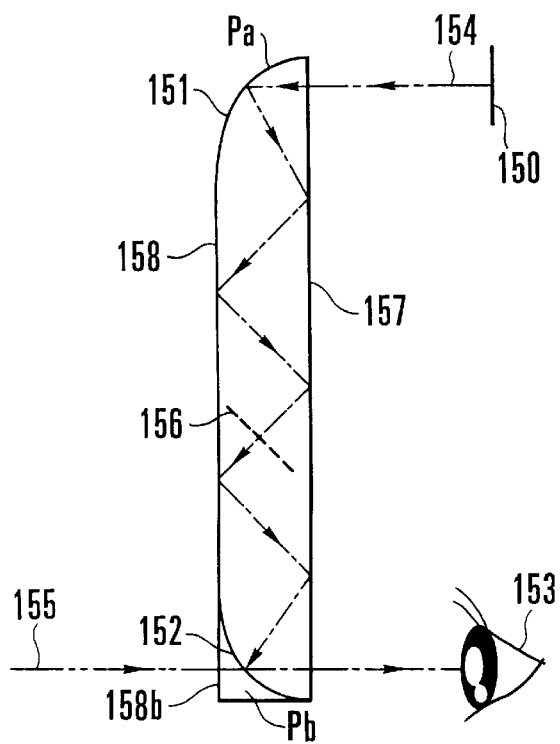
FIG. 6 is a schematic view of another observing optical system in which a conventional prism reflecting surface has a curvature.
Figure 7:
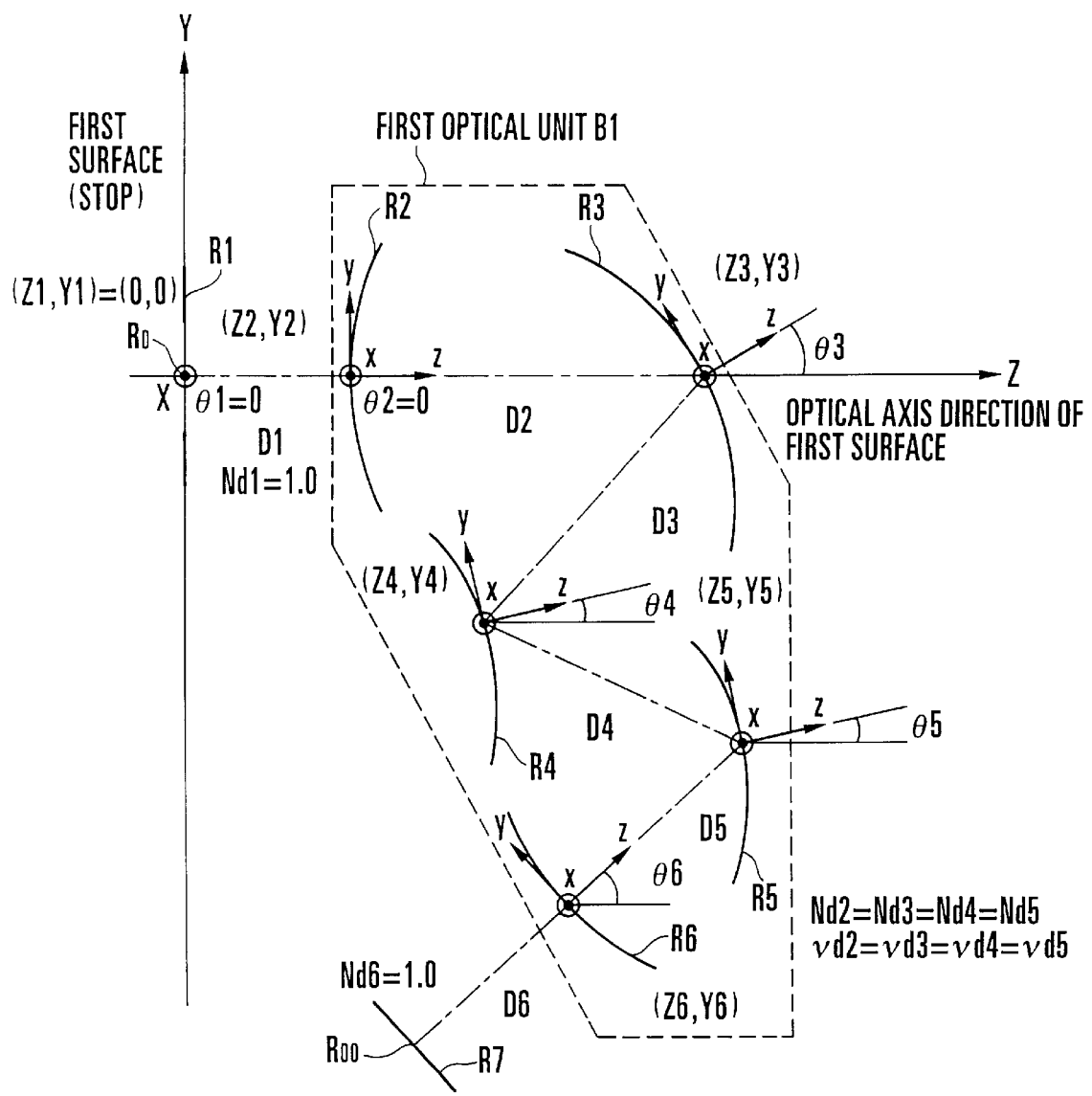
FIG. 7 is an explanatory view aiding in explaining a coordinate system which defines constituent data for an optical system according to each embodiment.

FIG. 7 is an explanatory view of a coordinate system which defines the constituent data of an optical system according to the present invention. In each of the embodiments of the present invention, the i-th surface is a surface which lies at the i-th position numbered from an object side from which a ray travels toward an image plane (the ray is shown by alternate long and short dash lines in FIG. 7 and is hereinafter referred to as the reference axis ray).

In FIG. 7, a first surface R1 is a stop, a second surface R2 is a refracting surface (an entrance surface) coaxial with the first surface R1, a third surface R3 is a reflecting surface which is tilted with respect to the second surface R2, a fourth surface R4 is a reflecting surface which is shifted and tilted with respect to the third surface R3, a fifth surface R5 is a reflecting surface which is shifted and tilted with respect to the fourth surface R4, and a sixth surface R6 is a refracting surface (an exit surface) which is shifted and tilted with respect to the fifth surface R5. All of the second surface R2 to the sixth surface R6 are formed on part of a medium (transparent body) such as glass or plastics which constitutes one optical unit. In FIG. 7, such optical unit is shown as a first optical unit B1.

Accordingly, in the arrangement shown in FIG. 7, the medium between an object plane (not shown) and the second surface R2 is air, the second surface R2 to the sixth surface R6 are arranged on a certain common medium, and the medium between the sixth surface R6 and a seventh surface R7 is air.

Since the optical system of any of the present embodiments is a decentered optical system, the surfaces which constitute part of the optical system do not have a common optical axis. For this reason, in each of the embodiments of the present invention, an absolute coordinate system is set the origin of which is the central point of an effective ray diameter at the first surface R1.

In each of the embodiments of the present invention, a central point Ro of the effective ray diameter at the first surface R1 is set as the origin, and the path of the ray (reference axis ray) which passes through this origin and a center Roo of a final image forming plane R7 is defined as a reference axis (or axes) of the optical system. In each of the present embodiments, the reference axes have directions, respectively. The directions correspond to the directions in which the reference axis ray travels to form an image.

In the embodiments of the present invention, although the reference axes which provide a reference for the optical system are set in the above-described manner, axes which are convenient for optical design, aberration correction or representation of the shape of each surface which constitutes part of the optical system may be adopted as the reference axes which provide a reference for the optical system. However, in general, the path of a ray which passes through the center of an image plane and through any one selected from among the center of the stop, the center of an entrance pupil, the center of an exit pupil, the center of the first surface of the optical system and the center of the final surface of the optical system is set as the reference axes which provide a reference for the optical system.

Specifically, in the embodiments of the present invention, although the ray (reference axis ray) which passes through the first surface, i.e., the central point of the effective ray diameter at the surface of the stop, and leads to the center of the final image forming plane is refracted and reflected along a path by individual refracting or reflecting surfaces, this path is set as the reference axis (axes). The order of the surfaces is set to the order in which the reference axis ray is subjected to refraction and reflection.

Accordingly, the reference axis finally reaches the center of the image plane while changing its direction in the order of the surfaces in accordance with the law of refraction or reflection.

Tilting planes which constitute part of the optical system of each of the embodiments of the present invention are basically tilted in the same plane. For this reason, each axis of the absolute coordinate system is defined as follows:

Z axis: reference axis which passes through the origin and extends to the second surface R2;

Y axis: straight line which passes through the origin and makes an angle of 90° with the Z axis in the counterclockwise direction in a tilting plane (on the surface of the sheet of FIG. 7); and X axis: straight line which passes through the origin and is perpendicular to each of the Z and Y axes (perpendicular to the surface of the sheet of FIG. 7).

If the surface shape of the i-th surface which constitutes part of the optical system is to be expressed, it is possible to more readily understand and recognize such surface shape by setting a local coordinate system the origin of which is a point at which the reference axis intersects the i-th surface, and expressing the surface shape of the i-th surface by using the local coordinate system than by expressing the surface shape of the i-th surface by using the absolute coordinate system. Accordingly, in some embodiments of the present invention the constituent data of which are shown herein, the surface shape of the i-th surface is expressed by its local coordinate system.

The tilting angle of the i-th surface in the Y, Z plane is expressed by an angle $\theta_i$ (unit: degree) which shows a positive value in the counterclockwise direction with respect to the Z axis of the absolute coordinate system. Accordingly, in each of the embodiments of the present invention, the origins of the local coordinate systems of the respective surfaces are located on the Y, Z plane, as shown in FIG. 7. The decentering of the surfaces is absent in the X, Z plane or the X, Y plane. In addition, the y and z axes of the local coordinates (x, y, z) of the i-th surface are inclined by the angle $\theta_i$ in the Y, Z plane with respect to the absolute coordinate system (X, Y, Z). Specifically, the x, y and z axes of the local coordinates (x, y, z) are set in the follow manner:

z axis: straight line which passes through the origin of the local coordinates and makes the angle $\theta_i$ with the Z direction of the absolute coordinate system in the counterclockwise direction in the Y, Z plane;

y axis: straight line which passes through the origin of the local coordinates and makes an angle of 90° with the z direction of the local coordinates in the counterclockwise direction in the Y, Z plane; and x axis: straight line which passes through the origin of the local coordinates and is perpendicular to the Y, Z plane.

Symbol Di indicates a scalar which represents the distance between the origin of the local coordinates of the i-th surface and that of the (i+1)-st surface. Symbols Ndi and υdi respectively indicate the refractive index and the Abbe number of the medium between the i-th surface and the (i+1)-st surface.

The optical system of each of the present embodiments has a plurality of optical units, and varies its entire focal length (magnification) by the movement of the plurality of optical units. Regarding each of the embodiments which have numerical data shown herein, the cross section of its optical system and the numerical data are shown with respect to three positions, i.e., a wide-angle end (W), a telephoto end (T) and a middle position (M).

If the optical unit shown in FIG. 7 moves in the Y, Z plane, the origin (Yi, Zi) of each of the local coordinate systems which represent the positions of the respective surfaces takes on a different value for each varied magnification position. However, in the case of the embodiments having the numerical data shown herein, since the optical unit is assumed to move in only the Z direction for the purpose of variation of magnification, the coordinate value Zi is expressed by Zi(W), Zi(M) and Zi(T) in the order of the wide-angle end, the middle position and the telephoto end.

Incidentally, the coordinate values of each of the surfaces represent those obtained at the wide-angle end, and each of the middle position and the telephoto end is expressed as a difference between the coordinate values obtained at the wide-angle end and the coordinate values obtained at the respective one of the middle position and the telephoto end. Specifically, letting "a" and "b" be the respective amounts of movements of the optical unit at the middle position (M) and the telephoto end (T) with respect to the wide-angle end (W), these amounts of movements are expressed by the following expressions:

$$Zi(M)=Zi(W)+a.$$

$$Zi(T)=Zi(W)+b.$$

If all the surfaces move in their Z plus directions, the signs of "a" and "b" are positive, whereas if they move in their Z minus directions, the signs of "a" and "b" are negative. The surface-to-surface distance Di which varies with these movements is a variable, and the values of the variable at the respective varied magnification positions are collectively shown on tables which will be referred to later.

Each of the present embodiments has spherical surfaces and aspheric surfaces of rotational asymmetry. The radius of curvature of each of the spherical surfaces is denoted by "ri". The sign of the radius of curvature "ri" is minus if the center of curvature is located on the side of the first surface along the reference axis (shown by the alternate long and short dash lines in FIG. 7) which travels from the first surface to the image plane, whereas if the center of curvature is located on the side of the image forming plane along the reference axis, the sign of the radius of curvature "ri" is plus.

Each of the spherical surfaces is a shape expressed by the following expression:

$$z = \frac{(x^2 + y^2)/ri}{1 + \{1 - (x^2 + y^2)/ri^2\}^{1/2}}.$$

In addition, the optical system of some of the present embodiments has at least one aspherical surface of rotational asymmetry, and its shape is expressed by the following expressions:

$$A=(a+b)\cdot(y^2\cdot\cos^2 t+x^2),$$

$$B=2a\cdot b\cdot\cos t[1+\{(b-a)\cdot y\cdot\sin t/(2a\cdot b)\}$$

$$+[1+\{(b-a)\cdot y\cdot\sin t/(a\cdot b)\}-\{y^2/(a\cdot b)\}]$$

$$+[1+\{(b-a)\cdot y\cdot\sin t/(a\cdot b)\}-\{y^2/(a\cdot b)\}/(4a^2b^2\cos^2 t)]^{1/2}],$$

so that $$z=A/B+C_{02}y^2+C_{11}xy+C_{20}x^2+C_{03}y^3+C_{12}xy^2+C_{21}x^2y+C_{04}y^4+C_{13}xy^3+C_{22}x^2y^2+C_{31}x^3y+C_{40}x^4+$$

The shape of each of the surfaces of rotational asymmetry is made symmetrical with respect to the Y, Z plane by using only the even-exponent terms regarding x in the above curved-surface equation and by setting the odd-exponent terms to "0". Further, if the following condition is satisfied, a shape symmetrical with respect to the X, Z plane is obtained:

$$C03=C21=t=0.$$

Further, if the following equations are satisfied, a shape of rotational symmetry is obtained $$C02=C20, C04=C40=C22/2.$$

If the above conditions are not satisfied, a shape of rotational asymmetry is obtained.

In each of the present embodiments, as shown in FIG. 7, the first surface R1 (the entrance side of the optical system) is the stop. A horizontal half-angle of view uY is the maximum angle of view of a light beam incident on the stop R1 in the Y, Z plane of FIG. 7, while a vertical half-angle of view uX is the maximum angle of view of a light beam incident on the stop R1 in the X, Z plane of FIG. 7. The diameter of the stop which is the first surface R1 is shown as an aperture diameter which relates to the brightness of the optical system. Since an entrance pupil is located at the first surface R1, the aperture diameter is equal to the diameter of the entrance pupil.

The effective image area in the image plane is represented by an image size which is represented by a rectangular region having a horizontal size taken in the y direction of the local coordinate system and a vertical size taken in the x direction of the local coordinate system.

Regarding each of the embodiments the constituent data of which are shown herein, the size of its optical system is also shown. The size is determined by the effective ray diameter at the wide-angle end.

Regarding the embodiments which are illustrated together with the constituent data, their respective lateral aberration charts are shown. Each of the lateral aberration charts shows the lateral aberrations of a light beam for the wide-angle end (W), the middle position (M) and the telephoto end (T), and the lateral aberrations are those of the light beam which is incident on the stop R1 at an angle of incidence which is defined by a horizontal angle of incidence and a vertical angle of incidence which are (uY, uX), (0, uX), (-uY, uX), (uY, 0), (0, 0) and (-uY, 0), respectively. In each of the lateral aberration charts, the horizontal axis represents the height of incidence on the pupil, and the vertical axis represents the amount of aberration. In any of the embodiments, since each of the surfaces basically has a shape symmetrical with respect to the Y, Z plane, the plus and minus directions of a vertical angle of view are the same in the lateral aberration chart. For this reason, the lateral aberration chart in the minus direction is omitted for the sake of simplicity.

Preferred embodiments will be described below.

[First Embodiment]

Figure 8A:
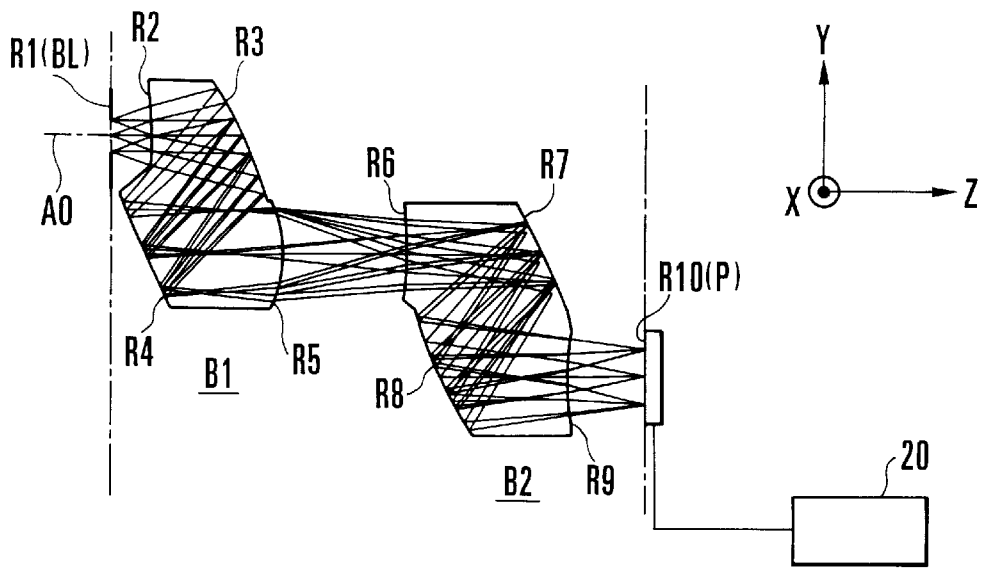
FIGS. 8(A), 8(B) and 8(C) are cross-sectional views taken on a Y, Z plane, of a zoom optical system according to a first embodiment of the present invention.
Figure 8B:
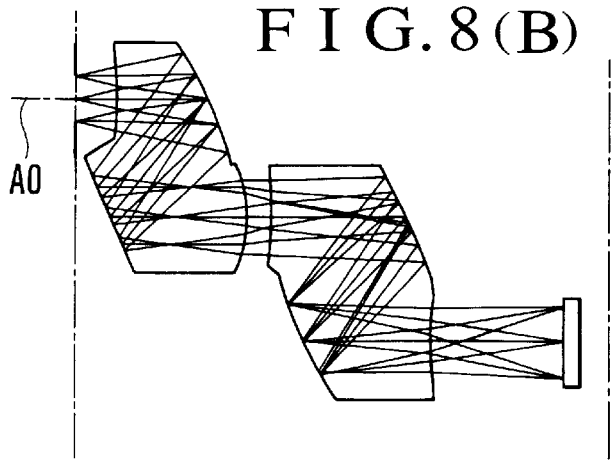
Figure 8C:
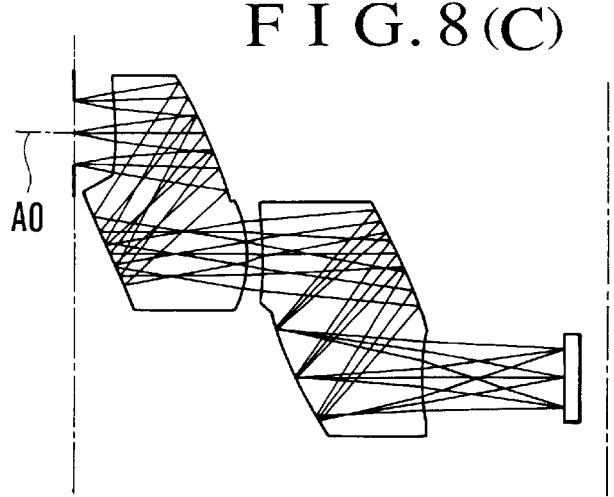

FIGS. 8(A), 8(B) and 8(C) are optical cross-sectional views, taken on the Y, Z plane, of a zoom optical system according to a first embodiment of the present invention. The first embodiment is intended for a two-optical-unit type of zoom optical system which is a photographing optical system having a variable magnification ratio of approximately 2×. Constituent data for the first embodiment are shown below.

FIGS. 8(A), 8(B) and 8(C) are cross-sectional views the optical system which is set to the wide-angle end (W), e middle position (M) and the telephoto end (T), respectively.

|  | WIDE-ANGLE END | MIDDLE POSITION | TELEPHOTO END |
|---|---|---|---|
| HORIZONTAL HALF-ANGLE OF VIEW | 19.1° | 13.0° | 9.8° |
| VERTICAL HALF-ANGLE OF VIEW | 14.5° | 9.8° | 7.4° |
| APERTURE SIZE (DIAMETER) | 2.00 mm | 3.00 mm | 4.00 mm |

-continued

| | IMAGE SIZE | | HORIZONTAL 5.0 mm × VERTICAL 3.8 mm | | | |
|---|---|---|---|---|---|---|
| | SIZE OF OPTICAL SYSTEM (X × Y × Z) = 6.4 mm × 21.3 mm × 34.7 mm AT WIDE-ANGLE END | | | | | |

| i | Yi | Zi(W) | θi | Di | Ndi | νdi | |
|---|---|---|---|---|---|---|---|
| 1 | 0.00 | 0.00 | 0.00 | 2.74 | 1 | | STOP |
| 2 | 0.00 | 2.74 | 0.00 | 6.00 | 1.51633 | 64.15 | REFRACTING SURFACE |
| 3 | 0.00 | 8.74 | 25.00 | 10.00 | 1.51633 | 64.15 | REFLECTING SURFACE |
| 4 | −7.66 | 2.31 | 25.00 | 9.00 | 1.51633 | 64.15 | REFLECTING SURFACE |
| 5 | −7.66 | 11.31 | 0.00 | VARIABLE | 1 | | REFRACTING SURFACE |
| 6 | −7.66 | 19.15 | 0.00 | 8.50 | 1.51633 | 64.15 | REFRACTING SURFACE |
| 7 | −7.66 | 27.65 | 25.00 | 10.00 | 1.51633 | 64.15 | REFLECTING SURFACE |
| 8 | −15.32 | 21.22 | 25.00 | 8.00 | 1.51633 | 64.15 | REFLECTING SURFACE |
| 9 | −15.32 | 29.22 | 0.00 | VARIABLE | 1 | | REFRACTING SURFACE |
| 10 | −15.32 | 34.22 | 0.00 | | 1 | | IMAGE PLANE |

| | WIDE-ANGLE END | MIDDLE POSITION | TELEPHOTO END |
|---|---|---|---|
| D5 | 7.83 | 1.54 | 1.00 |
| D9 | 5.00 | 8.41 | 8.97 |
| R1–R5 | Zi(M) = Zi(W) | | Zi(T) = Zi(W) |
| R6–R9 | Zi(M) = Zi(W) − 3.41 | | Zi(T) = Zi(W) − 3.97 |
| R10 | Zi(M) = Zi(W) − 2.88 | | Zi(T) = Zi(W) − 2.86 |

SPHERICAL SHAPE

R2  r2 = −18.881
R5  r5 = −7.631
R6  r6 = −26.761
R9  r9 = 18.295

ASPHERICAL SHAPE

| R3 | C02 = −1.91317e−02 | C20 = −4.01670e−02 | |
| --- | --- | --- | --- |
| | C03 = 2.36459e−04 | C21 = 9.91868e−04 | |
| | C04 = −7.77985e−06 | C22 = −5.54165e−05 | C40 = 3.02870e−05 |
| R4 | C02 = 3.65495e−03 | C20 = 8.27377e−03 | |
| | C03 = 4.25537e−04 | C21 = 3.49503e−03 | |
| | C04 = −9.14030e−05 | C22 = 1.12664e−03 | C40 = 2.17925e−04 |
| R7 | C02 = −7.61544e−03 | C20 = −1.95361e−02 | |
| | C03 = 1.67523e−04 | C21 = −6.31848e−05 | |
| | C04 = 3.65343e−05 | C22 = 3.17265e−05 | C40 = 4.72135e−06 |
| R8 | C02 = 1.74816e−02 | C20 = 2.84105e−04 | |
| | C03 = 1.83372e−05 | C21 = −6.22603e−04 | |
| | C04 = 1.46552e−05 | C22 = 4.33859e−05 | C40 = 7.18032e−05 |

The zoom optical system shown in FIGS. 8(A), 8(B) and 8(C) include a first optical unit B1 and a second optical unit B2 each having two refracting surfaces and a plurality of curved reflecting surfaces. The first optical unit B1 includes two reflecting surfaces and two refracting surfaces, i.e., a concave refracting surface R2, a concave mirror R3, a convex mirror R4 and a convex refracting surface R5 in that order as viewed from the object side. The second optical unit B2 includes two reflecting surfaces and two refracting surfaces, i.e., a concave refracting surface R6, a concave mirror R7, a concave mirror R8 and a concave refracting surface R9 in that order as viewed from the object side. The zoom optical system also includes a light receiving surface P on which a final image pickup surface is formed, for example, an image pickup element such as a CCD (image pickup medium).

In FIGS. 8(A) to 8(C), symbol BL denotes a stop which is disposed on the object side of the first optical unit B1 (the light-beam entrance side of the optical system), and symbol A0 denotes the reference axis of the zoom optical system. In FIG. 8(A), reference numeral 20 denotes driving means for moving the light receiving surface, but in FIGS. 8(B) and 8(C) the illustration of the driving means 20 is omitted for the sake of simplicity.

An image forming operation for an object lying at infinity will be described below.

First, a light beam from an object passes through the stop BL while being restricted to a required amount of incidence by the stop BL, and enters the first optical unit B1. In the first optical unit B1, the light beam is refracted by the second surface R2 and is then reflected from surface to surface by the third surface R3 and the fourth surface R4. The light beam reflected by the fourth surface R4 is refracted by the fifth surface R5 and exits from the first optical unit B1. At this time, the light beam forms a primary image on an intermediate image forming plane between the fourth surface R4 and the fifth surface R5.

Since an object image is formed in the first optical unit B1 in this manner, an increase in the effective ray diameter of each surface disposed on the image side of the stop BL is suppressed.

Then, the light beam enters the second optical unit B2. In the second optical unit B2, the light beam is refracted by the sixth surface R6 and is then reflected from surface to surface by the seventh surface R7 and the eighth surface R8. The light beam reflected by the eighth surface R8 is refracted by the ninth surface R9 and exits from the second optical unit B2. At this time, the light beam forms a pupil in the vicinity of the seventh surface R7 of the second optical unit B2. Then, the light beam which has exited from second optical unit B2 finally forms an image of the object on a tenth surface R10 (the light receiving surface P of the image pickup medium such as a CCD).

In this manner, refractions at the respective entrance and exit surfaces and reflections by the plurality of curved reflecting mirrors are repeated throughout the first and second optical units B1 and B2, so that the first and second optical units B1 and B2 function as a lens unit which is provided with desired optical performance and has a positive power as a whole.

In the first embodiment, the reflecting surfaces which constitute part of the optical system are so-called anamorphic surfaces whose curvatures parallel to the surface of the sheet of each of FIGS. 8(A) to 8(C) are different from their curvatures perpendicular to the surface of the sheet of the same, and the reflecting surfaces are arranged to correct decentering aberrations which occur due to the reflecting mirrors decentered for the purpose of preventing the light beam from being blocked in the mirror optical system.

In addition, by arranging these reflecting surfaces as rotationally asymmetrical surfaces, it is possible to fully correct various aberrations and achieve desired optical performance for each of the first and second optical units B1 and B2.

Incidentally, either one of the first and second optical units B1 and B2 may be a normal refracting lens or a surface reflecting mirror.

In the first embodiment, the focal length (image forming magnification) of the zoom optical system is varied by relatively moving the second optical unit B2 and the image pickup element surface (the light receiving surface) P. (This operation is called "variation of magnification" or "zooming".) Incidentally, the first optical unit B1 may be moved instead of the second optical unit B2.

The magnification varying operation of the first embodiment will be described below.

As shown in FIGS. 8(A), 8(B) and 8(C), during variation of magnification, the stop surface R1 and the first optical unit B1 and fixed. During variation of magnification from the wide-angle end toward the telephoto end, the second optical unit B2 moves in the Z minus direction.

During the variation of magnification from the wide-angle end toward the telephoto end, the light receiving surface P is driven by the driving means 20 to move temporarily in the Z minus direction and then in the Z plus direction. As the focal length varies from the wide-angle end toward the telephoto end, the distance between the optical units B1 and B2 decreases, while the distance between the second optical unit B2 and the light receiving surface P increases.

The action of the magnification varying operation will be described below with reference to FIGS. 9(A) and 9(B).

Figure 9A:
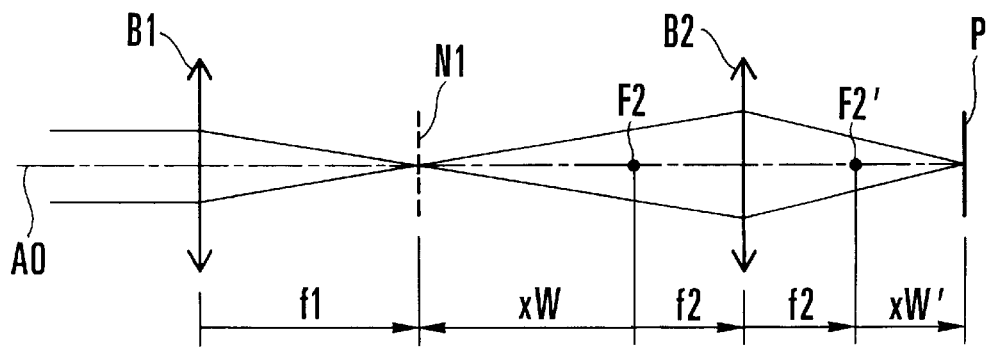
FIGS. 9(A) and 9(B) are explanatory views aiding in explaining the magnification varying operation of the zoom optical system according to the first embodiment.
Figure 9B:
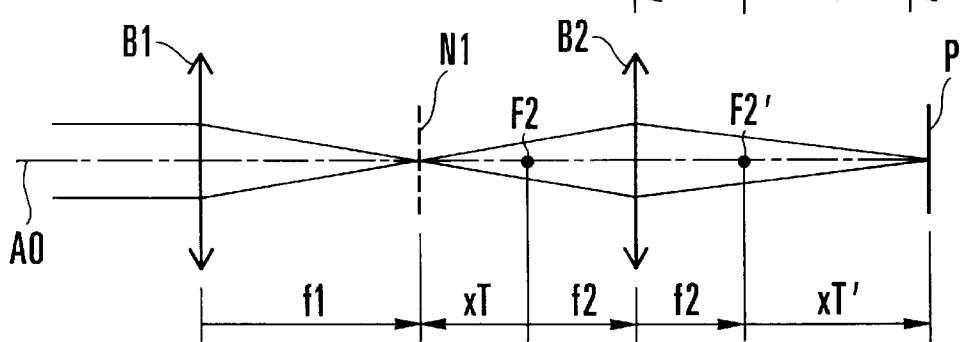

FIGS. 9(A) and 9(B) are optical layout views each showing the first and second optical units B1 and B2 in the form of single thin lenses, and show different states in which the zoom optical system is developed with respect to the reference axis A0.

In FIGS. 9(A) and 9(B), f1 represents the focal length of the first optical unit B1, f2 represents the focal length of the second optical unit B2, xW(−) represents the distance from a front focal point F2 of the second optical unit B2 to the primary image forming plane N1 with the zoom optical system being set to the wide-angle end (W), and xW represents the distance from a rear focal point F2' of the second optical unit B2 to the light receiving surface P with the zoom optical system being set to the wide-angle end (W). (The respective characters W and T mean a value which indicates that the optical system is set to the wide-angle end and a value which indicates that the optical system is set to the telephoto end.)

From Newton's formula for image formation, if $$xW \times xW' = -f2^2$$

is satisfied, an image forming magnification $\beta 2W$ of the second optical unit B2 becomes:

$$\beta 2W = -(xW'+f2)/(-xW+f2)$$

$$= f2/xW$$

$$= -xW'/f2 \qquad (1)$$

and also a focal length fW of the entire optical system at the wide-angle end becomes:

$$fW = f1 \times \beta 2W$$

$$= f1 \times f2/xW. \qquad (2)$$

Furthermore, in the first embodiment, during the variation of magnification from the wide-angle end toward the telephoto end, the first optical unit B1 is fixed, whereas the second optical unit B2 is moved to vary its image forming magnification, and the position of the light receiving surface P is varied to correct a variation of the final image forming plane due to the movement of the second optical unit B2.

Suppose that the second optical unit B2 has moved by a predetermined amount $\Delta$ and the zoom optical system has shifted from the wide-angle end (W) to the telephoto end (T). Letting xT(−) be the distance from the front focal point F2 of the second optical unit B2 to the intermediate image forming plane N1 for the telephoto end, and letting xW be the distance from the front focal point F2 of the second optical unit B2 to the intermediate image forming plane N1 for the wide-angle end, the distance xT(−) becomes the sum of the distance xW and the amount of movement, $\Delta$, of the second optical unit B2:

$$xT = xW + \Delta. \qquad (3)$$

Furthermore, from Newton's formula for image formation, a distance xT' from the rear focal point F2' of the second optical unit B2 to the light receiving surface P for the telephoto end becomes:

$$xT' = f2^2/xT$$

$$= -f2^2/(xW+\Delta). \qquad (4)$$

Therefore, the amount of movement, $\eta$, of the light receiving surface P relative to the amount of movement, $\Delta$, of the second optical unit B2 is expressed as:

$$\eta = xW + xW' - (xT + xT')$$

$$xW + xW' - (xW+\Delta - f2^2/(xW+\Delta))$$

$$= xW' - \Delta + f2^2/(xW+\Delta). \qquad (5)$$

An image forming magnification $\beta 2T$ of the second optical unit B2 at the telephoto end becomes:

$$\beta 2T = (xT'+f2)/(-xT+f2)$$

$$= f2/xT$$

$$= -xT'/f2, \qquad (6)$$

and also a focal length fT of the entire optical system at the telephoto end becomes:

$$fT = f1 \times \beta 2T$$

$$= f1 \times f2/xT. \qquad (7)$$

Therefore, a magnification variation ratio Z becomes:

$$Z = fT/fW$$

$$= xW/xT$$

$$= xW/(xW+\Delta). \qquad (8)$$

In this manner, the zoom optical system becomes able to vary the focal length (image forming magnification) by relatively moving the second optical unit B2 and the light receiving surface P while satisfying the relationship of Expression (5).

Although the focusing operation of the first embodiment can be achieved by moving the image forming plane or an arbitrary optical unit which constitutes part of the zoom optical system, it is preferable to move a member of lightest weight, in terms of the load of a focusing actuator.

In addition, if the amount of movement of the optical unit is to be fixed with respect to the distance to an object to be photographed, irrespective of the variation of magnification, it is preferable to move the first optical unit B1 disposed at a location closest to the object side.

Incidentally, if the second optical unit B2 which moves during the variation of magnification is arranged to be moved during focusing as well, both the focusing actuator and a magnification varying actuator can be achieved as a common arrangement.

Figure 10:
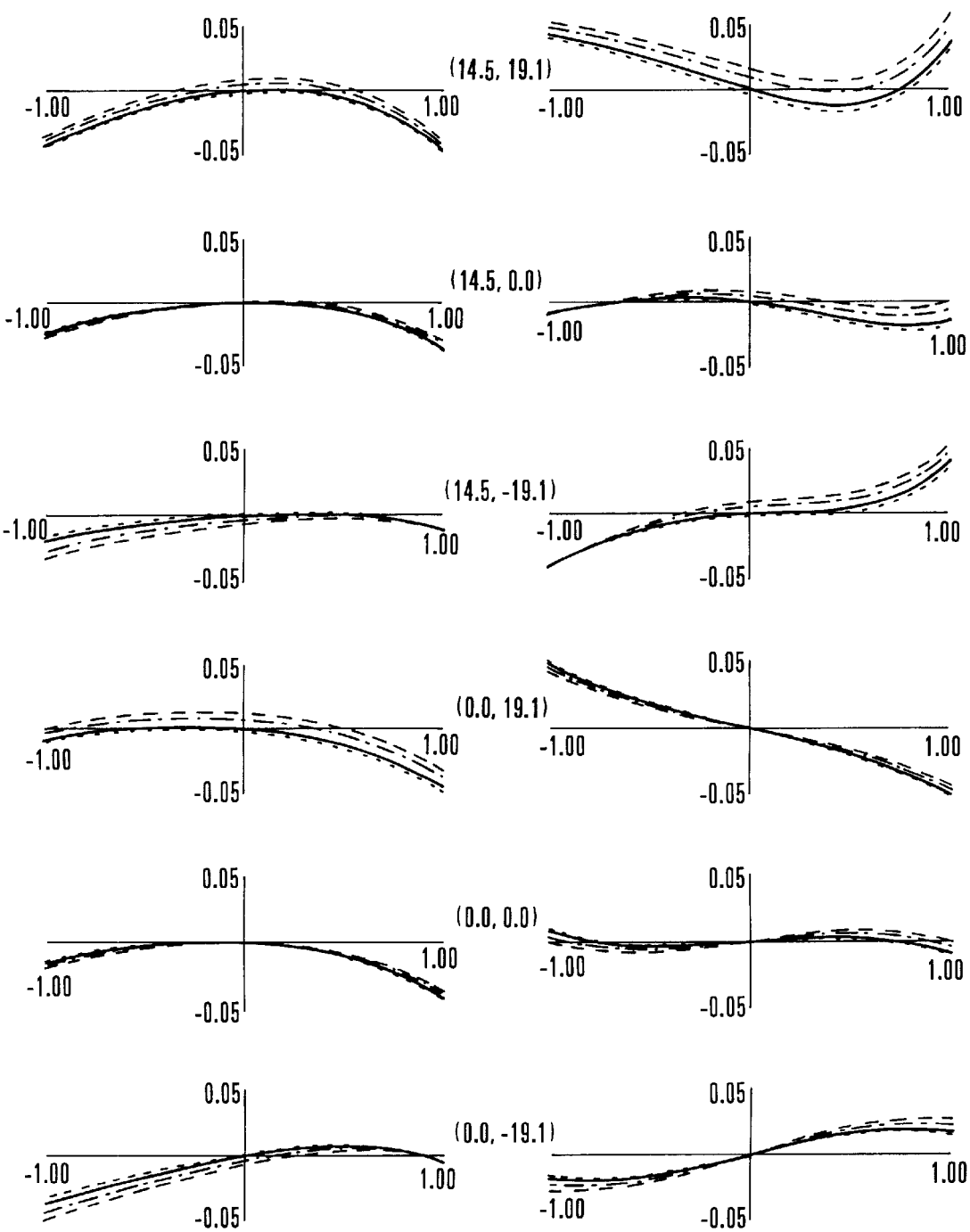
FIG. 10 shows lateral aberration charts (wide-angle end) of the zoom optical system according to the first embodiment.
Figure 11:
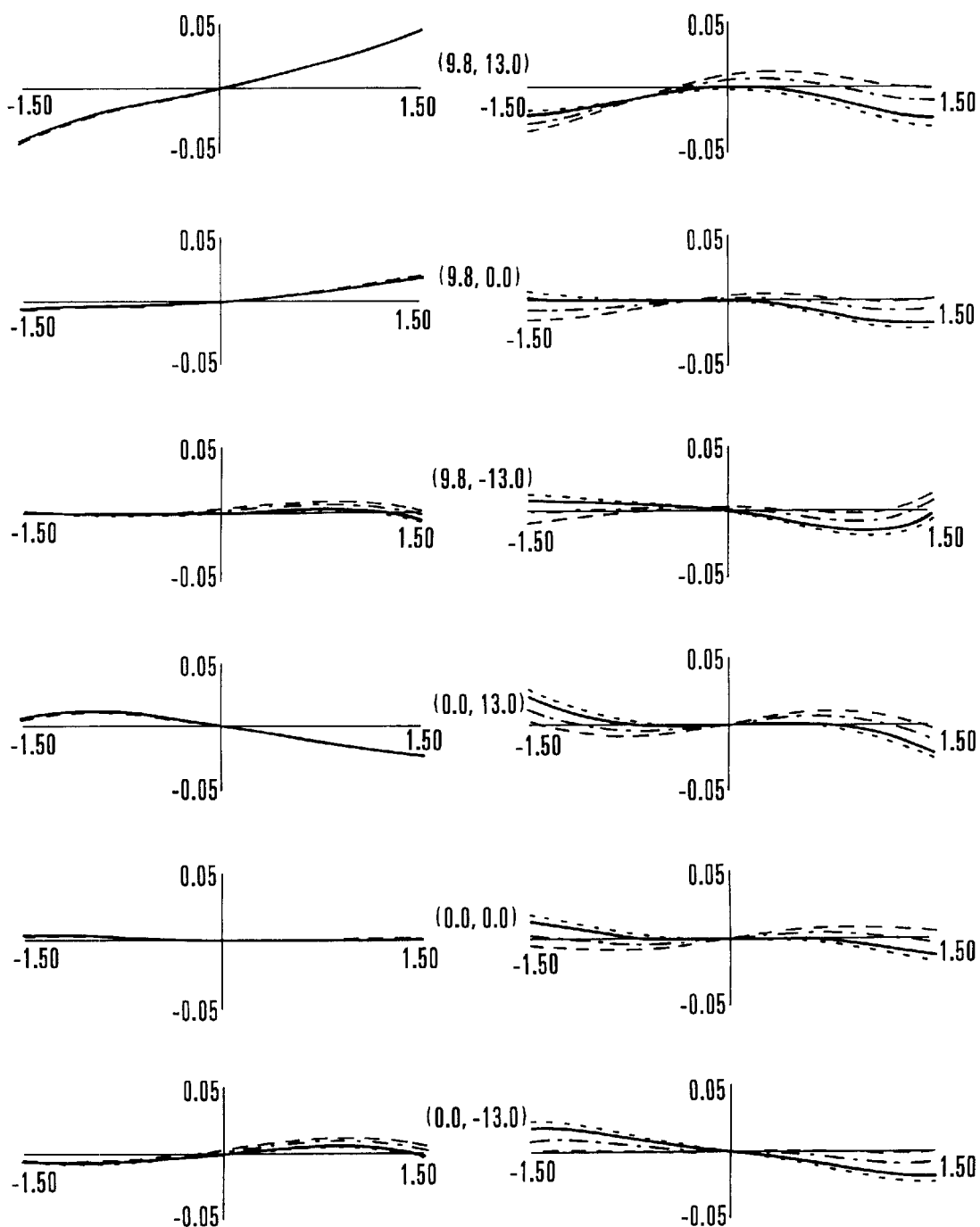
FIG. 11 shows lateral aberration charts (middle position) of the zoom optical system according to the first embodiment.
Figure 12:
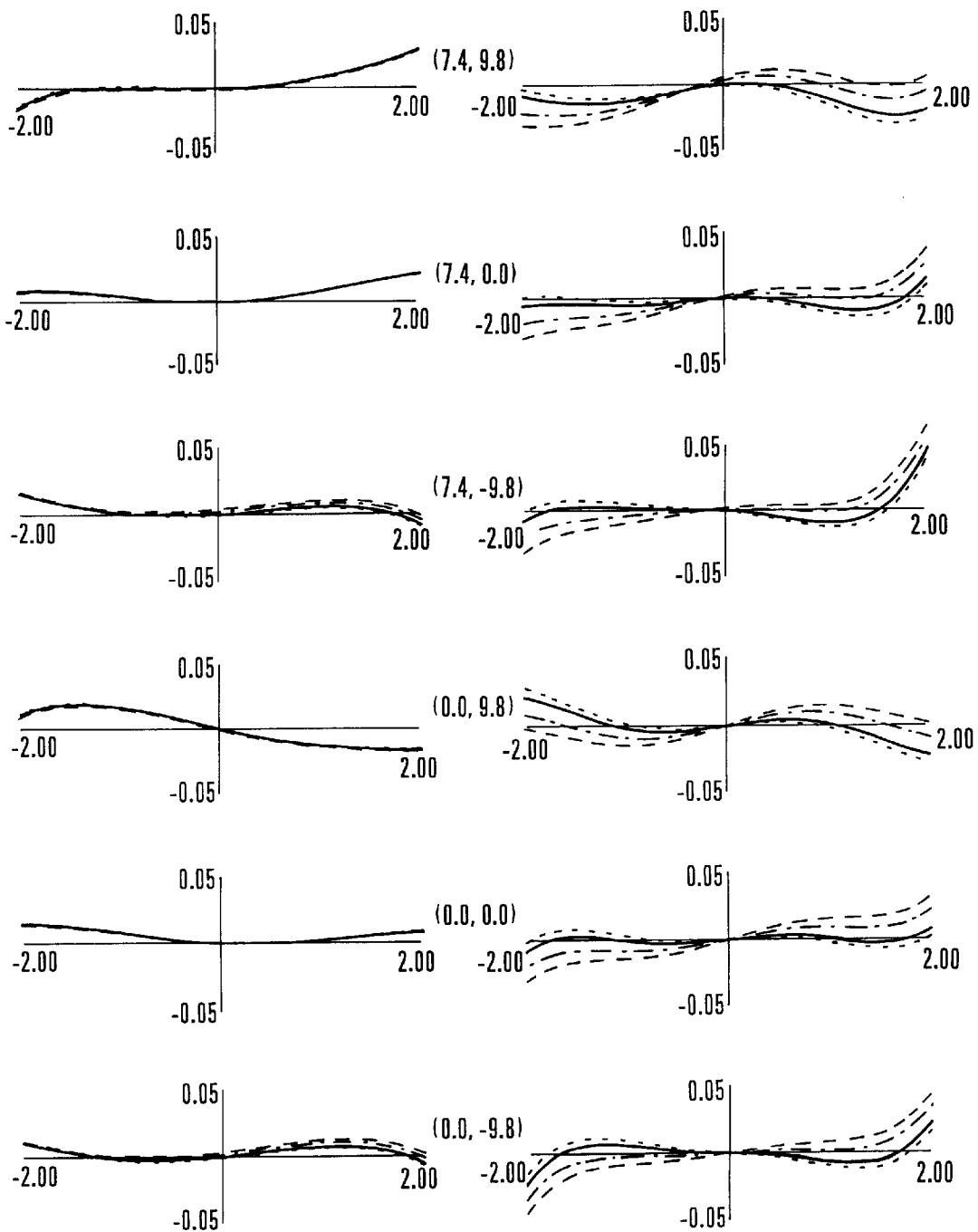
FIG. 12 shows lateral aberration charts (telephoto end) of the zoom optical system according to the first embodiment.

Each of FIGS. 10, 11 and 12 shows lateral aberration charts of the zoom optical system of the first embodiment. The respective lateral aberration charts show lateral aberrations in the Y and X directions, relative to six light beams which enter the first embodiment at different angles of incidence of (uY, uX), (0, uX), (−uY, uX), (uY, 0), (0, 0) and (−uY, 0), respectively. The horizontal axis of each of the lateral aberration charts represents the height of incidence in the Y or X direction of an incident light beam at the first surface.

FIG. 10 is a lateral aberration chart of the first embodiment for the wide-angle end (W), FIG. 11 is a lateral aberration chart of the same for the middle position (M), and FIG. 12 is a lateral aberration chart of the same for the telephoto end (T).

As can be seen from the lateral aberration charts, the first embodiment is capable of achieving well-balanced correction of aberrations for each of the focal lengths. The optical system of the first embodiment is compact because its length, width and thickness are selected to be approximately 34.7 mm×21.3 mm×6.4 mm for an image size of 5 mm×3.8 mm. Particularly in the first embodiment, because each of the optical units and the entire optical system has a small thickness and each of the optical units can be produced by forming reflecting surfaces on side faces of a plate-shaped block, it is possible to readily construct a zoom lens which is thin as a whole, by adopting a mechanism which causes one optical unit and an image forming plane to move along a surface of one base plate.

The effects and advantages of the first embodiment will be described below.

In the first embodiment, since the reflecting surfaces which move during variation of magnification are realized in the form of one optical unit, it is possible to guarantee the accuracy of the relative positions between the respective reflecting surfaces which require a highest position accuracy in conventional mirror optical systems. Accordingly, in the first embodiment, it is only necessary to ensure the position accuracy between the first optical unit B1 and the second optical unit B2, and, hence, the position accuracy may be similar to that of a moving optical unit used in a conventional refracting lens system.

As compared with a refracting lens system, since each of the optical units is constructed as a lens unit in which a plurality of curved reflecting surfaces are integrally formed, the required number of components of the entire optical system is reduced so that a reduction in the cost of the optical system can be achieved and accumulated errors due to the mounting of other components can be reduced.

By adopting the arrangement which transmits an object image by repeating image formation by a plurality of times, the effective ray diameter of each surface can be reduced so that each of the optical units and the entire zoom optical system can be made compact.

Since the image formation size of the intermediate image forming plane is set to be comparatively small with respect to the size of the image pickup surface, it is possible to reduce the effective ray diameter of each surface which is required to transmit the object image.

In many conventional zoom optical systems, stops are disposed in their optical systems. If a stop is disposed in the interior of an optical system, there is the problem that as an angle of view increases, a lens which is disposed on the object side of the stop at a greater distance therefrom requires a greater effective ray diameter.

In the first embodiment, since the stop BL is disposed in the vicinity of the entrance surface of the first optical unit B1 located on the object side of the zoom optical system, the effective ray diameter of the front lens unit of the zoom optical system is prevented from increasing when the focal length of the zoom optical system is shifted to a wide-angle side.

In addition, since the object image is formed in each of the optical units, an increase in the effective ray diameter of each surface disposed on the image side of the stop BL is effectively suppressed.

All the reference axes of the first optical unit B1 and the second optical unit B2 lie in the Y, Z plane. Accordingly, by setting the movement plane of each of the first optical unit B1 and the second optical unit B2 to a plane parallel to the Y, Z plane, it is possible to readily maintain the parallelism between the Y, Z plane which contains the reference axes and the movement plane of each of the first optical unit B1 and the second optical unit B2, even if the first optical unit B1 and the second optical unit B2 move during variation of magnification. Accordingly, it is possible to readily prevent parallel decentering from occurring in the X-axis direction of each the optical units B1 and B2, and also to readily eliminate the rotation of each of the optical units B1 and B2 about the Y axis or the Z axis.

Incidentally, even if the Y, Z plane which contains the reference axes and the movement plane of both optical units B1 and B2 are inclined, no decentering aberration occurs as long as a direction vector relative to the movement during variation of magnification of the Y, Z plane which contains the reference axes is parallel to the movement plane of the Y, Z plane.

Since each of the optical units B1 and B2 is arranged on one plane, it is possible to readily adopt a structure which enables the optical units B1 and B2 to be incorporated from one direction, so that assembly becomes very easy.

Incidentally, although in the first embodiment the primary image forming plane N1 is formed in the interior of the first optical unit B1, the primary image forming plane N1 may be formed at an intermediate position between the first optical unit B1 and the second optical unit B2.

Regarding the moving directions of the optical elements during variation of magnification, errors which occur during the variation of magnification can be minimized if the position of the point of incidence of the reference axis on each reflecting surface is not varied during the movements of the respective optical elements from the wide-angle end toward the telephoto end. Therefore, the directions of the reference axes which enter and exit from each of the optical units B1 and B2 are made parallel, and the moving direction of each of the optical units B1 and B2 is made parallel to the reference axes which enter and exit from each of the optical units B1 and B2.

In the first embodiment, if the optical units are arranged so that the directions of the reference axes which enter and exit from each of the optical units are parallel to each other, there are available patterns of two kinds in one of which the respective directions of the entering and exiting reference axes are the same as each other, and in the other of which the respective directions of the entering and exiting reference axes are opposite to each other.

If the direction of the entering reference axis is made opposite to the direction of the exiting reference axis, the space on the entrance side of a moving optical unit and the space on the exit side of the same vary with the movement of the moving optical unit by the same amount as the amount of movement of the moving optical unit, so that the entire optical path length can be varied by an amount equivalent to twice the amount of movement of the optical unit.

If the direction of the entering direction is made the same as the direction of the exiting reference axis, the position of the entering reference axis and the position of the exiting reference axis can be shifted to desired positions, respectively.

Since the first embodiment can be constructed in either of the above two kinds of patterns, it is possible to increase the freedom of design of the optical layout of the first embodiment.

However, the moving direction of a moving optical unit need not necessarily be parallel to the directions of the reference axes which enter and exit from the two optical units, and, for example, the direction of the reference axis which enters the optical system and the moving direction of the moving optical unit may make an angle of approximately 30°, 45°, 60° or the like.

[Second Embodiment]

FIGS. 13(A), 13(B) and 13(C) are optical cross-sectional views, taken on the Y, Z plane, of a zoom optical system according to a second embodiment of the present invention. The second embodiment is intended for a three-optical-unit type of zoom optical system which is a photographing optical system having a variable magnification ratio of approximately 3×. Constituent data for the second embodiment are shown below.

FIGS. 13(A), 13(B) and 13(C) are cross-sectional views of the optical system which is set to the wide-angle end (W), the middle position (M) and the telephoto end (T), respectively.

|  | WIDE-ANGLE END | MIDDLE POSITION | TELEPHOTO END |
|---|---|---|---|
| HORIZONTAL HALF-ANGLE OF VIEW | 26.0° | 18.0° | 9.2° |
| VERTICAL HALF-ANGLE OF VIEW | 20.0° | 13.6° | 6.9° |
| APERTURE SIZE (DIAMETER) | 2.00 mm | 2.50 mm | 3.00 mm |
| IMAGE SIZE | HORIZONTAL 4.9 mm × VERTICAL 3.8 mm | | |
| SIZE OF OPTICAL SYSTEM (X × Y × Z) = 11.4 mm × 94.1 mm × 39.4 mm AT WIDE-ANGLE END | | | |

| i | Yi | Zi(W) | θi | Di | Ndi | νdi |  |
|---|---|---|---|---|---|---|---|
| 1 | 0.00 | 0.00 | 0.00 | 3.00 | 1 |  | STOP |
| 2 | 0.00 | −3.00 | 0.00 | 7.00 | 1.51633 | 64.15 | REFRACTING SURFACE |
| 3 | 0.00 | −10.00 | 28.00 | 11.00 | 1.51633 | 64.15 | REFLECTING SURFACE |
| 4 | 9.12 | −3.85 | 14.00 | 11.00 | 1.51633 | 64.15 | REFLECTING SURFACE |
| 5 | 14.28 | −13.56 | 0.00 | 11.00 | 1.51633 | 64.15 | REFLECTING SURFACE |
| 6 | 19.45 | −3.85 | −14.00 | 11.00 | 1.51633 | 64.15 | REFLECTING SURFACE |
| 7 | 28.57 | −10.00 | −28.00 | 7.00 | 1.51633 | 64.15 | REFRACTING SURFACE |
| 8 | 28.57 | −3.00 | 0.00 | VARIABLE | 1 |  | REFRACTING SURFACE |
| 9 | 28.57 | 14.26 | 0.00 | 8.00 | 1.51633 | 64.15 | REFRACTING SURFACE |
| 10 | 28.57 | 22.26 | −28.00 | 11.00 | 1.51633 | 64.15 | REFLECTING SURFACE |
| 11 | 37.69 | 16.11 | −14.00 | 11.00 | 1.51633 | 64.15 | REFLECTING SURFACE |
| 12 | 42.85 | 25.82 | 0.00 | 11.00 | 1.51633 | 64.15 | REFLECTING SURFACE |
| 13 | 48.01 | 16.11 | 14.00 | 11.00 | 1.51633 | 64.15 | REFLECTING SURFACE |
| 14 | 57.13 | 22.26 | 28.00 | 10.00 | 1.51633 | 64.15 | REFLECTING SURFACE |
| 15 | 57.13 | 12.26 | 0.00 | VARIABLE | 1 |  | REFRACTING SURFACE |
| 16 | 57.13 | 5.26 | 0.00 | 10.00 | 1.51633 | 64.15 | REFRACTING SURFACE |
| 17 | 57.13 | −4.74 | 28.00 | 11.00 | 1.51633 | 64.15 | REFLECTING SURFACE |
| 18 | 66.25 | 1.41 | 14.00 | 11.00 | 1.51633 | 64.15 | REFLECTING SURFACE |
| 19 | 71.42 | −8.30 | 0.00 | 11.00 | 1.51633 | 64.15 | REFLECTING SURFACE |
| 20 | 76.58 | 1.41 | −14.00 | 11.00 | 1.51633 | 64.15 | REFLECTING SURFACE |
| 21 | 85.70 | −4.74 | −28.00 | 8.00 | 1.51633 | 64.15 | REFLECTING SURFACE |
| 22 | 85.70 | 3.26 | 0.00 | VARIABLE | 1 |  | REFRACTING SURFACE |
| 23 | 85.70 | 13.86 | −0.00 |  | 1 |  | IMAGE PLANE |

|  | WIDE-ANGLE END | MIDDLE POSITION | TELEPHOTO END |
|---|---|---|---|
| D8 | 17.26 | 15.09 | 12.59 |
| D15 | 7.00 | 4.83 | 2.33 |
| D22 | 10.60 | 13.54 | 21.67 |
| R1–R8 | Zi(M) = Zi(W) | | Zi(T) = Zi(W) |
| R9–R15 | Zi(M) = Zi(W) − 2.17 | | Zi(T) = Zi(W) − 4.67 |
| R16–R22 | Zi(M) = Zi(W) | | Zi(T) = Zi(W) |
| R23 | Zi(M) = Zi(W) + 2.94 | | Zi(T) = Zi(W) + 11.07 |

SPHERICAL SHAPE

R2  r2 = ∞
R8  r8 = ∞
R9  r9 = −26.000
R15 r15 = −30.000
R16 r16 = 30.000
R22 r22 = ∞

ASPHERICAL SHAPE

R3

C02 = 2.44499e−02    C20 = 2.75157e−02
C03 = 1.45859e−04    C21 = 2.72919e−04
C04 = 4.35506e−06    C22 = 4.84214e−05    C40 = −2.80587e−05

R4

C02 = 9.33381e−03    C20 = 1.89178e−02
C03 = −1.23387e−03   C21 = −1.49301e−03
C04 = 1.12090e−04    C22 = 2.09854e−04    C40 = −1.67990e−04

R5

C02 = 2.49279e−02    C20 = 3.32521e−02
C03 = −6.83648e−05   C21 = 4.50510e−05
C04 = 2.36929e−05    C22 = 6.60670e−05    C40 = 4.63548e−05

R6

C02 = 2.80846e−02    C20 = 4.51122e−02
C03 = 4.69190e−04    C21 = 7.18496e−03
C04 = 4.63253e−05    C22 = 8.19783e−04    C40 = 7.46789e−04

R7

C02 = 2.24950e−02    C20 = 3.26223e−02
C03 = −1.28259e−05   C21 = 1.20287e−04
C04 = 1.70764e−05    C22 = 1.99071e−05    C40 = 4.56660e−05

R10

C02 = −1.85321e−02   C20 = −3.55795e−02
C03 = −9.52709e−05   C21 = −8.45572e−04
C04 = 6.78869e−06    C22 = −3.47748e−05   C40 = −6.08816e−05

R11

C02 = 4.83395e−04    C20 = 3.29864e−02
C03 = 3.42701e−04    C21 = 1.90412e−03
C04 = −6.29724e−05   C22 = 2.69461e−05    C40 = 3.87401e−05

R12

C02 = −2.00920e−02   C20 = −3.30804e−02
C03 = −1.18516e−04   C21 = 2.26788e−04
C04 = −2.11278e−05   C22 = −1.07562e−04   C40 = −4.37345e−05

R13

C02 = −6.25834e−03   C20 = −1.72074e−02
C03 = −2.65746e−04   C21 = −9.76857e−04
C04 = −6.04066e−05   C22 = 3.92791e−05    C40 = −6.77933e−05

R14

C02 = −2.03026e−02   C20 = −1.38319e−02
C03 = −1.56582e−04   C21 = −4.34649e−04
C04 = −2.48357e−05   C22 = 4.66902e−06    C40 = 1.65898e−05

-continued

R17

| | | | | | |
|---|---|---|---|---|---|
| C02 = | 1.58016e−02 | C20 = | 1.93096e−02 | | |
| C03 = | 1.29465e−04 | C21 = | 4.06481e−04 | | |
| C04 = | 3.25388e−06 | C22 = | 8.70161e−06 | C40 = | 2.07235e−05 |

R18

| | | | | | |
|---|---|---|---|---|---|
| C02 = | 2.60144e−02 | C20 = | 4.84881e−02 | | |
| C03 = | −7.52023e−04 | C21 = | 5.24980e−03 | | |
| C04 = | 8.92761e−05 | C22 = | −2.91207e−04 | C40 = | 6.11387e−04 |

R19

| | | | | | |
|---|---|---|---|---|---|
| C02 = | 2.09707e−02 | C20 = | 2.41342e−02 | | |
| C03 = | −1.55662e−04 | C21 = | 5.91129e−04 | | |
| C04 = | 2.04612e−05 | C22 = | 2.47885e−05 | C40 = | 3.17668e−05 |

R20

| | | | | | |
|---|---|---|---|---|---|
| C02 = | 1.60100e−02 | C20 = | 2.37145e−02 | | |
| C03 = | −6.18879e−04 | C21 = | 1.80005e−03 | | |
| C04 = | 6.48447e−05 | C22 = | 2.54838e−04 | C40 = | 2.97835e−04 |

R21

| | | | | | |
|---|---|---|---|---|---|
| C02 = | 1.65909e−02 | C20 = | 2.32003e−02 | | |
| C03 = | −1.04921e−04 | C21 = | −6.26765e−05 | | |
| C04 = | 5.30580e−06 | C22 = | 1.67866e−05 | C40 = | 2.20098e−05 |

The zoom optical system shown in FIGS. 13(A), 13(B) and 13(C) include a first optical unit B1, a second optical unit B2 and a third optical unit B3 each having a plurality of curved reflecting surfaces. The first optical unit B1 includes five reflecting surfaces and two refracting surfaces, i.e., a plane surface R2, a concave mirror R3, a convex mirror R4, a concave mirror R5, a convex mirror R6, a concave mirror R7 and a plane surface R8 in that order as viewed from the object side. The first optical unit B1 has a positive refractive power as a whole, and the direction of a reference axis A0 which enters the first optical unit B1 is parallel and opposite to the direction of a reference axis which exits from the first optical unit B1.

The second optical unit B2 includes five reflecting surfaces and two refracting surfaces, i.e., a concave refracting surface R9, a concave mirror R10, a convex mirror R11, a concave mirror R12, a convex mirror R13, a concave mirror R14 and a concave refracting surface R15 in that order as viewed from the object side. The second optical unit B2 has a positive refractive power as a whole, and the direction of the reference axis A0 which enters the second optical unit B2 is parallel and opposite to the direction of a reference axis which exits from the second optical unit B2.

The third optical unit B3 includes five reflecting surfaces and two refracting surfaces, i.e., a concave refracting surface R16, a concave mirror R17, a convex mirror R18, a concave mirror R19, a convex mirror R20, a concave mirror R21 and a plane surface R22 in that order as viewed from the object side. The third optical unit B3 has a positive refractive power as a whole, and the direction of a reference axis which enters the third optical unit B3 is parallel and opposite to the direction of a reference axis which exits from the third optical unit B3.

The zoom optical system also includes a light receiving surface P, for example, a surface of an image pickup element such as a CCD (image pickup medium). In FIG. 13(A), symbol BL denotes a stop which is disposed on the object side of the first optical unit B1, and reference numeral 20 denotes driving means for moving the light receiving surface P, but in FIGS. 13(B) and 13(C) the illustration of the driving means 20 is omitted for the sake of simplicity.

Incidentally, at least one of the first, second and third optical units B1, B2 and B3 may be a normal refracting lens or a surface reflecting mirror.

An image forming operation for an object lying at infinity will be described below.

First, a light beam from an object passes through the stop BL while being restricted to a required amount of incidence by the stop BL, and enters the first optical unit B1. In the first optical unit B1, the light beam is refracted by the second surface R2 and is then reflected from surface to surface by the third surface R3, the fourth surface R4, the fifth surface R5, the sixth surface R6 and the seventh surface R7. The light beam reflected by the seventh surface R7 is refracted by the eighth surface R8 and exits from the first optical unit B1.

At this time, the light beam forms a primary image in the vicinity of the fourth surface R4. In addition, the light beam forms a secondary image between the first optical unit B1 and the second optical unit B2.

Then, the light beam enters the second optical unit B2. In the second optical unit B2, the light beam is refracted by the ninth surface R9 and is reflected from surface to surface by the tenth surface R10, the eleventh surface R11, the twelfth surface R12, the thirteenth surface R13 and the fourteenth surface R14. The light beam reflected by the fourteenth surface R14 is refracted by the fifteenth surface R15 and exits from the second optical unit B2. At this time, the light beam forms a tertiary image forming plane between the twelfth surface R12 and the thirteenth surface R13. In addition, the light beam forms a pupil in the vicinity of the fifteenth surface R15.

Then, the light beam which has exited from the second optical unit B2 enters the third optical unit B3. In the third optical unit B3, the light beam is refracted by the sixteenth surface R16 and is reflected from surface to surface by the seventeenth surface R17, the eighteenth surface R18, the nineteenth surface R19, the twentieth surface R20 and the twenty-first surface R21. The light beam reflected by the twenty-first surface R21 is refracted by the twenty-second surface R22 and exits from the third optical unit B3. At this time, the light beam has a quaternary image forming plane between the seventeenth surface R17 and the eighteenth surface R18.

The light beam which has exited from the third optical unit B3 finally form an image of the object on the light receiving surface P (the image pickup surface of the image pickup medium such as a CCD) which is a final image forming plane.

In the second embodiment, in order to shorten the length of the zoom optical system in the Z direction as viewed in each of FIGS. 13(A), 13(B) and 13(C), a layout is adopted which effectively folds the entire optical path through each of the optical units to remarkably reduce the length of the zoom optical system in the Z direction.

Specifically, all of the first to third optical units B1 to B3 are arranged so that the directions of their entering reference axes are respectively parallel and opposite to the directions of their exiting reference axes, and the optical units B1 to B3 are arranged in a staggered manner so that the length of the zoom optical system is reduced in the entering direction of a light beam, i.e., in the Z direction as viewed in FIGS. 13(A), 13(B) and 13(C).

In the above-described manner, in the second embodiment, each of the optical units is appropriately disposed to effectively fold the optical path so that the length of the zoom optical system can be reduced in an arbitrary direction (in the second embodiment, in the Z direction).

Regarding the direction of the reference axis which enters the zoom optical system, the reference axis may be made to enter the zoom optical system in a direction perpendicular to the surface of the sheet, as by disposing a 45° mirror or the like on the object side of the stop BL.

In addition, in the second embodiment, since the first optical unit B1 is fixed during variation of magnification, the first optical unit B1 and its reflecting surfaces for bending the entering reference axis may be integrally formed in advance.

The movements of the respective optical units during a magnification varying operation will be described below.

In the second embodiment, during variation of magnification, the stop surface R1, the first optical unit B1 and the third optical unit B3 are fixed.

The members which move during variation of magnification are the second optical unit B2 and the light receiving surface P, and the second optical unit B2 moves in the Z plus direction during variation of magnification from the wide-angle end toward the telephoto end. During such variation of magnification, the light receiving surface P is driven by the driving means 20 to move in the Z minus direction by an amount of movement different from the amount of movement of the second optical unit B2.

As the focal length varies from the wide-angle end toward the telephoto end, the distance between the first and second optical units B1 and B2 decreases, the distance between the second and third optical units B2 and B3 decreases, and the distance between the third optical unit B3 and the light receiving surface P increases. If the first optical unit B1 and the third optical unit B3 which are fixed during variation of magnification are virtually combined and regarded as one fixed optical unit which does not move during variation of magnification, it will be understood that the action of the magnification varying operation of the second embodiment is similar to that described previously in connection with the first embodiment. The description of such action is, therefore, omitted for the sake of simplicity.

Figure 14:
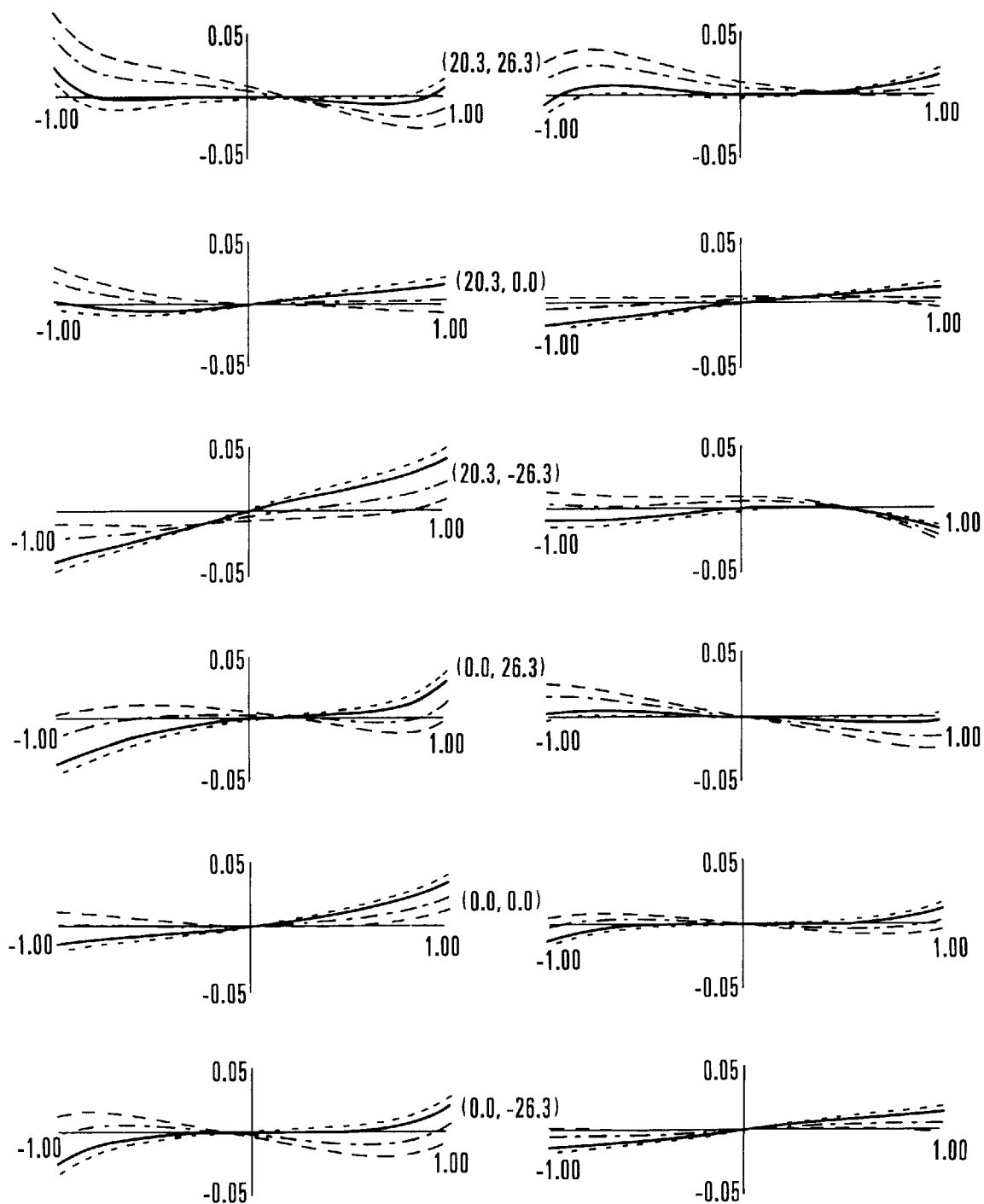
FIG. 14 shows lateral aberration charts (wide-angle end) of the zoom optical system according to the second embodiment.
Figure 15:
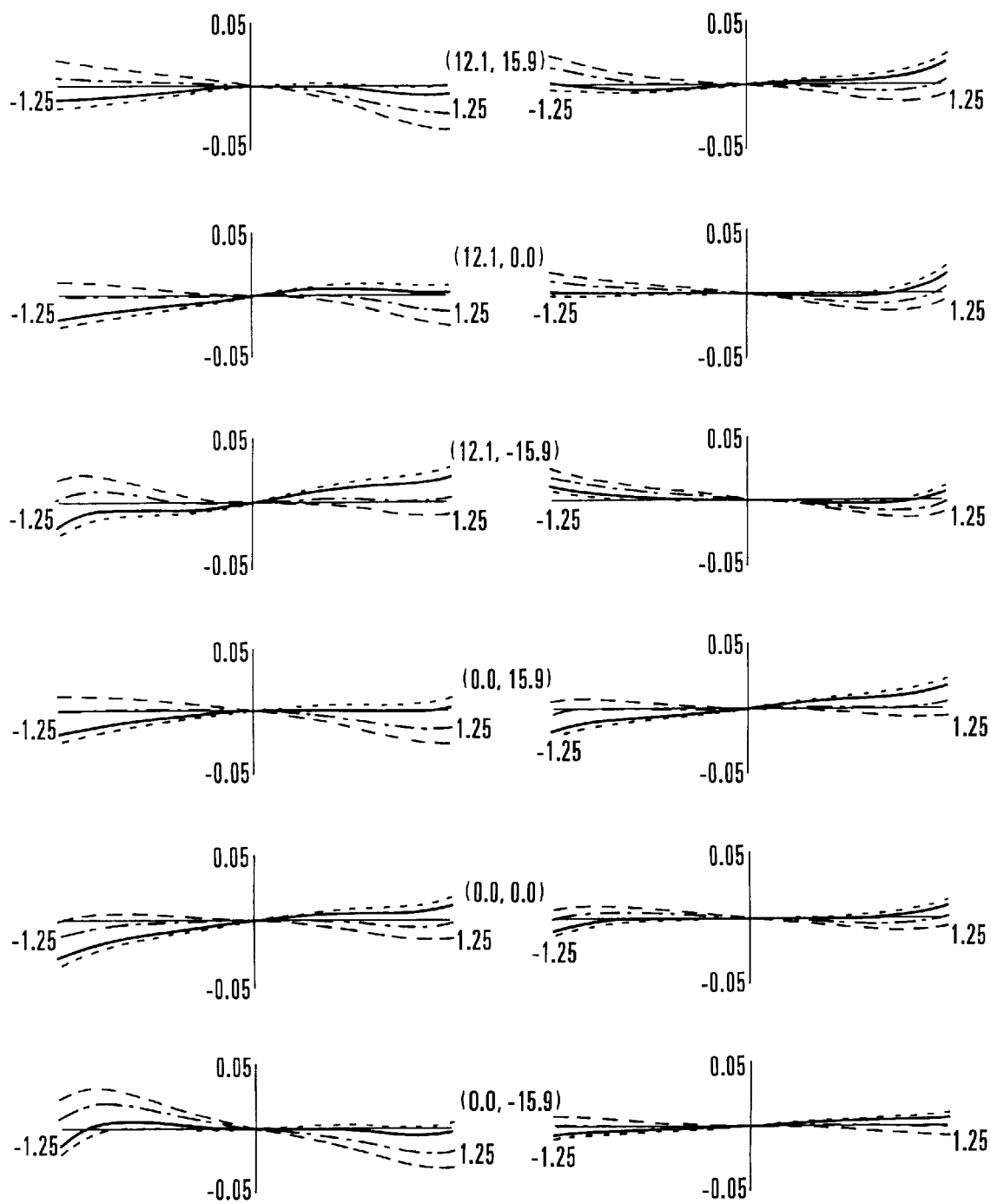
FIG. 15 shows lateral aberration charts (middle position) of the zoom optical system according to the second embodiment.
Figure 16:
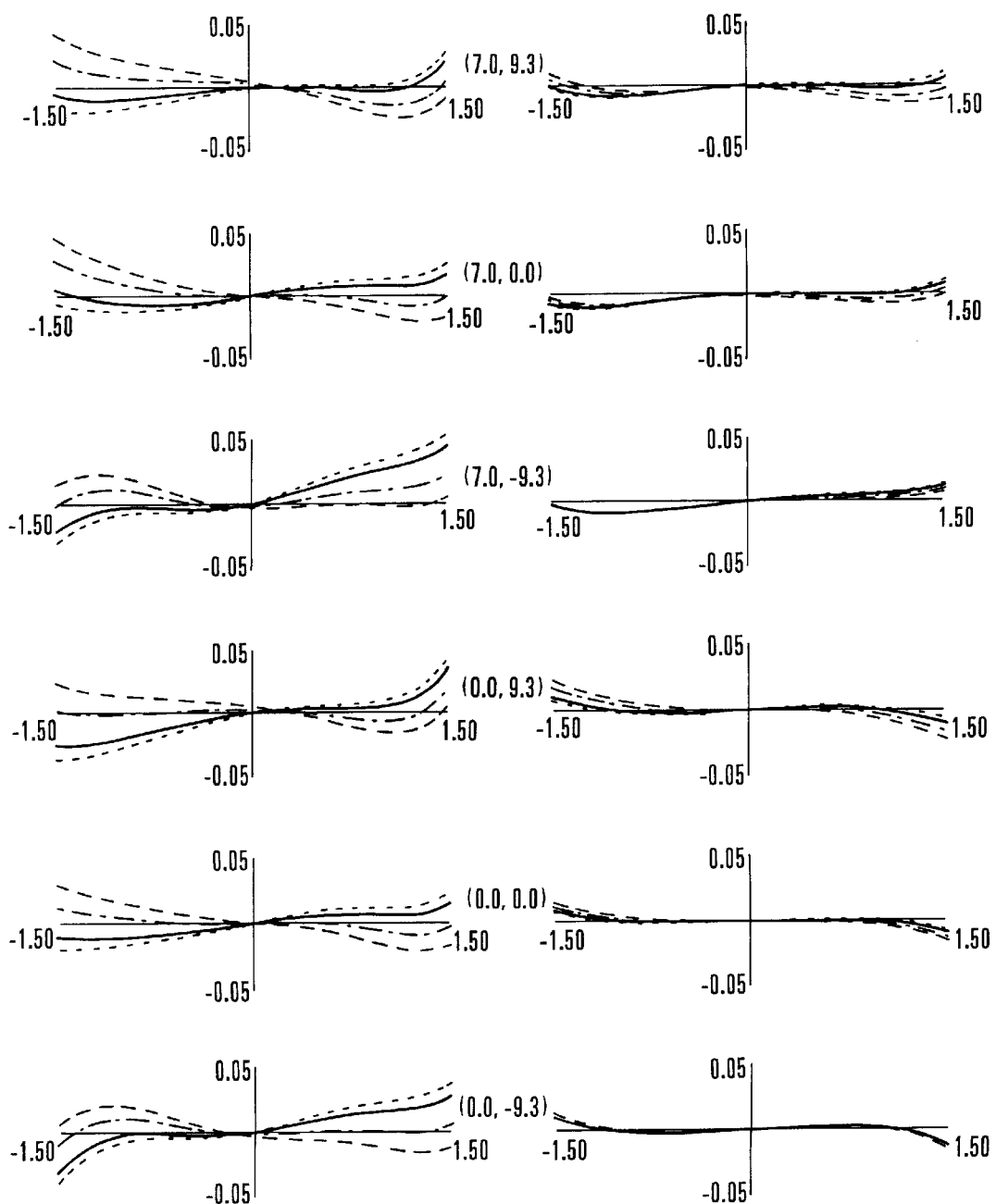
FIG. 16 shows lateral aberration charts (telephoto end) of the zoom optical system according to the second embodiment.

Each of FIGS. 14, 15 and 16 shows lateral aberration charts of the second embodiment.

As can be seen from the lateral aberration charts, the second embodiment is capable of achieving well-balanced correction of aberrations for each of the focal lengths.

In the second embodiment, focusing is performed by moving at least one of the first, second and third optical units or the image forming plane.

The length, width and thickness of the optical system of the second embodiment are selected to be approximately 39.4 mm×94.1 mm×11.4 mm for an image size of 4.9 mm×3.8 mm. In the second embodiment, since the entire optical system has a small thickness, it is possible to readily construct a zoom lens which is thin as a whole, by adopting an arrangement in which three optical units are mounted on one base plate so that one of the optical units and the image forming plane move along a surface of the base plate.

As is apparent from the foregoing description, the zoom optical system according to each of the embodiments of the present invention has a plurality of optical units in each of which a plurality of curved reflecting surfaces and plane reflecting surfaces are integrally formed, and performs zooming by moving an image forming plane and at least one of the optical units. Accordingly, it is possible to achieve a zoom optical system whose entire mirror optical system is miniaturized and which has a reduced arrangement accuracy (assembly accuracy) of reflecting mirrors, compared to conventional mirror optical systems. In addition, it is possible to achieve an image pickup apparatus employing such a zoom optical system.

It is also possible to achieve a reflecting type of zoom optical system which has a wide angle of view in spite of its reduced effective diameter owing to an arrangement in which a stop is disposed at a location closest to the object side of the optical system and an object image is formed in the optical system at least once, and also which has an entire length which is reduced in a predetermined direction by bending an optical path in the optical system into a desired shape by giving appropriate refractive powers to a plurality of reflecting surfaces of each optical unit and decentering such reflecting surfaces. In addition, it is possible to achieve an image pickup apparatus using such reflecting type of zoom optical system.

Further, in each of the zoom optical system according to the first and second embodiments, since the reflecting surfaces which move during variation of magnification are formed into a unit, as compared with the magnification varying operation of a conventional mirror optical system, it is possible to ensure the relative position accuracy of each of the reflecting surfaces which requires a highest accuracy, so that it is possible to prevent degradation of optical performance due to variation of magnification.

Further, since the optical units on each of which the reflecting surfaces are integrally formed are employed, the optical units themselves play the role of a lens barrel so that a mount member which is remarkably simple compared to conventional lens barrels can be used.

Further, since each of the optical units is formed as an optical unit on which a plurality of surfaces having curvatures are integrally formed, the number of components of the entire photographing system can be reduced compared to an optical system completely composed of refracting lenses. Accordingly, the cost of the photographing system can be reduced because of the reduced number of components.

Further, since the number of components of the entire photographing system can be reduced, accumulated errors due to the mounting of the components can be reduced so that it is possible to prevent degradation of optical performance.

Further, since the reflecting surfaces of each of the optical units are disposed at appropriate positions in a decentered state, the optical path in the optical system can be bent into a desired shape so that the entire length of the optical system can be reduced.

Further, by providing an optical unit which is fixed during variation of magnification, some of reference axes can be inclined at an arbitrary angle with respect to a plane which contains almost all the reference axes so that the freedom of design of the forms of cameras can be expanded.

Further, by adopting an arrangement for transmitting an object image by repeating image formation by a plurality of times, the effective ray diameter of each surface can be reduced so that the entire photographing optical system can be made compact.

Further, since the image formation size of an intermediate image forming plane is set to be comparatively small with respect to the size of a surface of an image pickup element, it is possible to reduce the effective ray diameter of each surface which is required to transmit the object image.

Further, since the plane on which the optical units move is set to be parallel to the plane which contains almost all reference axes, inclusive of the reference axes in the optical units which move during variation of magnification, it is possible to readily maintain the parallelism between the plane which contains the reference axes and the plans on which the optical units move, even if the optical units move during variation of magnification. Accordingly, it is possible to eliminate decentering aberration due to a relative inclination between the movement plane on which the optical units move during variation of magnification and the plane which contains the reference axes.

Further, since the optical units move on one plane during variation of magnification, it is possible to readily prevent parallel decentering from occurring in a direction perpendicular to the direction of movement of the optical units. In addition, the rotation of each of the optical units in a plane perpendicular to the movement plane can be eliminated in principle.

Further, since each of the optical units is arranged on one plane, the optical units can be incorporated from one direction, so that assembly becomes easy and assembly cost can be reduced.

Further, since the stop is disposed on the object side of the optical system, it is possible to achieve a zoom lens having an optical system the angle of view of which can be made wider without increasing the lens diameter of the optical system.

What is claimed is:

1. A zoom optical system comprising:
    a first optical unit having a refractive power, said first optical unit having a reflecting surface;
    a second optical unit having a refractive power; and
    driving means for moving an image pick-up surface which receives light from an object through said first optical unit and said second optical unit,
    wherein said zoom optical system performs variation of magnification by moving at least one of said first optical unit and said second optical unit, and a deviation of a focus position due to the variation of magnification is corrected by moving the image pick-up surface by said driving means, and
    wherein said first optical unit is provided with a plurality of surfaces,
    at least one of said plurality of surfaces being decentered with respect to other surfaces, and
    at least one of said Plurality of surfaces being an aspheric surface of rotational asymmetry.

2. A zoom optical system according to claim 1, wherein said first optical unit has a plurality of reflecting surfaces.

3. A zoom optical system according to claim 1, wherein the light from the object forms an intermediate image in an optical path of said zoom optical system.

4. A zoom optical system according to claim 3, wherein the light from the object forms an intermediate image in an optical path of said first optical unit.

5. A zoom optical system according to claim 1, wherein the direction of a reference axis ray entering said first optical unit and the direction of the reference axis ray exiting from said first optical unit are substantially parallel to each other, where the reference axis ray is a ray passing through the center of a pupil of said zoom optical system and the center of the light receiving surface.

6. A zoom optical system according to claim 5, wherein at least one of said first optical unit and said second optical unit moves in a plane including the reference axis ray in parallel therewith.

7. A zoom optical system according to claim 1, further comprising an aperture stop disposed on an object side relative to said first optical unit and said second optical unit.

8. A zoom optical system according to claim 7, further comprising a third optical unit having a refractive power.

9. A zoom optical system according to claim 8, wherein said third optical unit has a transparent body provided with a refracting entrance surface, an internal reflecting surface and a refracting exit surface.

10. A zoom optical system according to claim 9, wherein at least one of the refracting entrance surface, the internal reflecting surface and the refracting exit surface of said third optical unit is decentered with respect to other surfaces, and at least one of the refracting entrance surface, the internal reflecting surface and the refracting exit surface of said third optical unit is an aspheric surface of rotational asymmetry.

11. A zoom optical system according to claim 8, wherein said third optical unit is fixed during variation of magnification.

12. A zoom optical system according to claim 7, wherein said driving means performs focusing by moving the light receiving surface.

13. A zoom optical system according to claim 1, wherein said first optical unit has a solid transparent body provided with a refracting entrance surface, an internal reflecting surface and a refracting exit surface.

14. A zoom optical system according to claim 13, wherein said first optical unit is provided with a plurality of internal reflecting surfaces.

15. A zoom optical system according to claim 13, wherein the light from the object forms an intermediate image in an optical path of said first optical unit.

16. A zoom optical system according to claim 13, wherein the direction of a reference axis ray entering said first optical unit and the direction of the reference axis ray exiting from said first optical unit are substantially parallel to each other, where the reference axis ray is a ray passing through the center of a pupil of said zoom optical system and the center of the light receiving surface.

17. A zoom optical system according to claim 16, wherein at least one of said first optical unit and said second optical unit moves in a plane including the reference axis ray in parallel therewith.

18. A zoom optical system according to claim 13, wherein at least one of the refracting entrance surface, the internal reflecting surface and the refracting exit surface of said first optical unit is decentered with respect to other surfaces, and at least one of the refracting entrance surface, the internal reflecting surface and the refracting exit surface of said first optical unit is an aspheric surface of rotational asymmetry.

19. A zoom optical system according to claim 13, further comprising an aperture stop disposed on an object side relative to said first optical unit and said second optical unit.

20. A zoom optical system according to claim 13, wherein said second optical unit has a solid transparent body provided with a refracting entrance surface, an internal reflecting surface and a refracting exit surface.

21. A zoom optical system according to claim 20, wherein at least one of the refracting entrance surface, the internal reflecting surface and the refracting exit surface of said second optical unit is decentered with respect to other surfaces, and at least one of the refracting entrance surface, the internal reflecting surface and the refracting exit surface of said second optical unit is an aspheric surface of rotational asymmetry.

22. A zoom optical system according to claim 1, further comprising a third optical unit having a refractive power.

23. A zoom optical system according to claim 22, wherein said third optical unit has a transparent body provided with a refracting entrance surface, an internal reflecting surface and a refracting exit surface.

24. A zoom optical system according to claim 23, wherein at least one of the refracting entrance surface, the internal reflecting surface and the refracting exit surface of said third optical unit is decentered with respect to other surfaces, and at least one of the refracting entrance surface, the internal reflecting surface and the refracting exit surface of said third optical unit is an aspheric surface of rotational asymmetry.

25. A zoom optical system according to claim 22, wherein said third optical unit is fixed during variation of magnification.

26. A zoom optical system according to claim 1, wherein said driving means performs focusing by moving the light receiving surface.

27. An image pickup apparatus comprising:

a first optical unit having a refractive power, said first optical unit having a reflecting surface;

a second optical unit having a refractive power;

an image pick-up element for receiving light from an object through said first optical unit and said second optical unit; and driving means for moving said image pick-up element, wherein said image pickup apparatus performs variation of magnification by moving at least one of said first optical unit and said second optical unit, and a deviation of a focus position due to the variation of magnification is corrected by moving said image pick-up element by said driving means, and wherein said first optical unit is provided with a plurality of surfaces, at least one of said plurality of surfaces being decentered with respect to other surfaces, and at least one of said plurality of surfaces being an aspheric surface of rotational asymmetry.

28. An optical system comprising:

an optical unit having a refractive power, said optical unit being provided with a reflecting surface; and driving means for performing focusing by moving an image pick-up surface which receives light from an object through said optical unit, wherein said optical unit is provided with a plurality of surfaces, at least one of said plurality of surfaces being decentered with respect to other surfaces, and at least one of said plurality of surfaces being an aspheric surface of rotational asymmetry.

29. An optical system according to claim 28, wherein said optical unit has a plurality of reflecting surfaces.

30. An optical system according to claim 28, wherein the light from the object forms an intermediate image in an optical path of said optical system.

31. An optical system according to claim 30, wherein the light from the object forms an intermediate image in an optical path of said optical unit.

32. An optical system according to claim 28, further comprising an aperture stop disposed on an object side relative to said optical unit.

33. An optical system according to claim 28, wherein said optical unit has a transparent body provided with a refracting entrance surface, an internal reflecting surface and a refracting exit surface.

34. An optical system according to claim 33, wherein said optical unit has a plurality of reflecting surfaces.

35. An optical system according to claim 33, wherein the light from the object forms an intermediate image in an optical path of said optical unit.

36. An optical system according to claim 33, wherein at least one of the refracting entrance surface, the internal reflecting surface and the refracting exit surface of said optical unit is decentered with respect to other surfaces, and at least one of the refracting entrance surface, the internal reflecting surface and the refracting exit surface of said optical unit is an aspheric surface of rotational asymmetry.

37. An optical system according to claim 33, further comprising an aperture stop disposed on an object side relative to said optical unit.

38. An image pickup apparatus comprising:

an optical unit having a refractive power, said optical unit being provided with a reflecting surface;

an image pick-up element for receiving light from an object through said optical unit; and driving means for performing focusing by moving said image pick-up element.

\* \* \* \* \*

UNITED STATES PATENT AND TRADEMARK OFFICE
CERTIFICATE OF CORRECTION

PATENT NO.    : 6,124,986
DATED         : September 26, 2000
INVENTOR(S)   : Makoto Sekita et al.

It is certified that error appears in the above-identified patent and that said Letters Patent is hereby corrected as shown below:

Column 7,
Line 24, "set" should read -- set, --.

Column 8,
Line 34, "follow" should read -- following --.
Line 57, "are" should read -- is --.

Column 9,
Line 56, "$C_{22}X^2y^2+ C_{31}x^3y+C_{40}x^4+$" should read -- $C_{22}X^2y^2+C_{31}x^3y+C_{40}x^4+...$ --.
Line 67, "obtained" should read -- obtained: --.

Column 10,
Line 54, "views" should read -- views of --.
Line 55, "e" should read -- the --.

Column 11,
Line 51, "include" should read -- includes --.

Column 13,
Line 3, "and" should read -- are --.
Line 26, "xW" should read -- xW' --.

Column 14,
Line 15, "xW+xW'-" should read -- =xW+xW'- --.

Column 19,
Line 26, "include" should read -- includes --.

Column 20,
Line 40, "form" should read -- forms --.

UNITED STATES PATENT AND TRADEMARK OFFICE
CERTIFICATE OF CORRECTION

PATENT NO. : 6,124,986
DATED : September 26, 2000
INVENTOR(S) : Makoto Sekita et al.

It is certified that error appears in the above-identified patent and that said Letters Patent is hereby corrected as shown below:

Column 22,
Line 10, "of the" should be deleted.
Line 15, "position" should read -- positional --.
Line 61, "plans" should read -- plane --.

Column 23,
Line 36, "Plurality" should read -- plurality --.

Signed and Sealed this

Eleventh Day of December, 2001

*Attest:*

NICHOLAS P. GODICI
*Attesting Officer*     *Acting Director of the United States Patent and Trademark Office*